US010782925B2

(12) United States Patent
Suh et al.

(10) Patent No.: US 10,782,925 B2
(45) Date of Patent: Sep. 22, 2020

(54) METHOD AND APPARATUS FOR DISPLAYING SCHEDULE ON WEARABLE DEVICE

(71) Applicant: Samsung Electronics Co., Ltd., Suwon-si, Gyeonggi-do (KR)

(72) Inventors: Ji-Eun Suh, Seoul (KR); Ju-Youn Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/191,930

(22) Filed: Feb. 27, 2014

(65) Prior Publication Data

US 2014/0347289 A1 Nov. 27, 2014

(30) Foreign Application Priority Data

May 22, 2013 (KR) ........................ 10-2013-0057756

(51) Int. Cl.
*G06F 3/0488* (2013.01)
*G06F 3/14* (2006.01)
(Continued)

(52) U.S. Cl.
CPC ............ *G06F 3/1423* (2013.01); *G06F 1/163* (2013.01); *G06F 3/017* (2013.01); *G06F 3/0362* (2013.01);
(Continued)

(58) Field of Classification Search
CPC ......... G09G 2340/145; G09G 2380/00; G09G 2340/02; G09G 2354/00; G09G 2370/16;
(Continued)

(56) References Cited

U.S. PATENT DOCUMENTS 5,410,367 A * 4/1995 Zahavi ................... G04G 11/00
348/E5.096
6,525,997 B1 2/2003 Narayanaswami et al.
(Continued)

FOREIGN PATENT DOCUMENTS

| CN | 102667662 A | 9/2012 | |
| JP | 2008227706 A * | 9/2008 | ............. H04N 5/445 |
| WO | 2012/061440 A2 | 5/2012 | |

OTHER PUBLICATIONS

English language translation of the JP 2008-227706 A document, Emiko Tajima et al, Sep. 25, 2008, 31 pages.*
(Continued)

*Primary Examiner* — Jeff Piziali
(74) *Attorney, Agent, or Firm* — Jefferson IP Law, LLP

(57) ABSTRACT

A method of displaying a schedule on a wearable additional device is provided. The method includes connecting a portable electronic device which can synchronize a schedule, receiving a user input for displaying the schedule on a display screen of the wearable additional device, and displaying the schedule received from the portable electronic device on the display screen of the wearable additional device in response to the user input, wherein the schedule is displayed in a form of sector areas corresponding to a plurality of schedule items, and each of the sector areas has an area proportional to a time of a corresponding schedule item from among a total time of schedule data which can be displayed on the display screen of the wearable additional device.

7 Claims, 21 Drawing Sheets

(51) Int. Cl.
*G06F 3/0484* (2013.01)
*G06F 1/16* (2006.01)
*G06F 3/0362* (2013.01)
*G06F 3/0485* (2013.01)
*G06F 3/01* (2006.01)
*G06F 3/041* (2006.01)

(52) U.S. Cl.
CPC ............ *G06F 3/041* (2013.01); *G06F 3/0485* (2013.01); *G06F 3/0488* (2013.01); *G06F 3/04847* (2013.01); *G06F 3/1454* (2013.01); *G09G 2340/02* (2013.01); *G09G 2340/145* (2013.01); *G09G 2354/00* (2013.01); *G09G 2370/12* (2013.01); *G09G 2370/16* (2013.01); *G09G 2380/00* (2013.01)

(58) Field of Classification Search
CPC . G09G 2370/12; G06F 3/1423; G06F 3/1454; G06F 3/0488; G06F 3/04847; G06F 1/163; G06F 3/0362; G06F 3/0485; G06F 3/017; G06F 3/041
See application file for complete search history.

(56) References Cited

U.S. PATENT DOCUMENTS

| | | | | |
|---|---|---|---|---|
| 6,560,612 B1* | 5/2003 | Yamada | ................ | G06F 1/1616 |
| 6,809,724 B1 | 10/2004 | Shiraishi et al. | | |
| 6,977,868 B2* | 12/2005 | Brewer | ................ | G04G 21/00 |
| | | | | 368/46 |
| 7,788,121 B1* | 8/2010 | Smith | ................ | G06Q 10/06 |
| | | | | 705/7.26 |
| 8,024,665 B2* | 9/2011 | Pasquero | ......... | G06Q 10/06311 |
| | | | | 345/1.1 |
| 8,396,902 B2* | 3/2013 | Pasquero | ............. | G06Q 10/109 |
| | | | | 707/803 |
| 2001/0021998 A1* | 9/2001 | Margulis | ............. | H04L 12/2812 |
| | | | | 725/81 |
| 2003/0151982 A1 | 8/2003 | Brewer et al. | | |
| 2004/0194131 A1* | 9/2004 | Ellis | .................... | H04N 5/44543 |
| | | | | 725/34 |
| 2005/0097623 A1 | 5/2005 | Tecot et al. | | |
| 2005/0187805 A1* | 8/2005 | English | ............ | G06Q 10/06314 |
| | | | | 705/7.24 |
| 2007/0074262 A1* | 3/2007 | Kikkoji | .................. | H04H 60/27 |
| | | | | 725/131 |
| 2007/0255811 A1* | 11/2007 | Pettit | .................... | G06F 16/9577 |
| | | | | 709/220 |
| 2008/0022285 A1* | 1/2008 | Cherkasova | ............ | G06F 9/505 |
| | | | | 718/104 |
| 2010/0045705 A1 | 2/2010 | Vertegaal et al. | | |
| 2011/0007075 A1* | 1/2011 | Lee | ....................... | G06F 3/0482 |
| | | | | 345/440 |
| 2011/0040803 A1 | 2/2011 | Pasquero et al. | | |
| 2011/0041068 A1* | 2/2011 | Pasquero | ......... | G06Q 10/06311 |
| | | | | 715/738 |
| 2012/0066629 A1 | 3/2012 | Lee et al. | | |
| 2012/0083934 A1 | 4/2012 | Jesudason et al. | | |
| 2014/0229195 A1* | 8/2014 | Reynolds | ............... | G06Q 10/04 |
| | | | | 705/2 |

OTHER PUBLICATIONS

Korean Office Action with English translation dated Nov. 5, 2019; Korean Appln. No. 10-2013-0057756.

* cited by examiner

METHOD AND APPARATUS FOR DISPLAYING SCHEDULE ON WEARABLE DEVICE

CROSS-REFERENCE TO RELATED APPLICATION(S)

This application claims the benefit under 35 U.S.C. § 119(a) of a Korean patent application filed on May 22, 2013 in the Korean Intellectual Property Office and assigned Serial No. 10-2013-0057756, the entire disclosure of which is hereby incorporated by reference.

TECHNICAL FIELD

The present disclosure relates generally to providing a user interface in an electronic device. More particularly, the present disclosure relates to a method and an apparatus for displaying a schedule on a wearable additional device.

BACKGROUND

Portable electronic devices are small devices which have been developed for the convenience of performing digital work and may be implemented in various forms, such as a Personal Digital Assistant (PDA), a video player, a smart phone or the like. A smart phone, for example, has various applications as well as a call function. Additionally, users can freely download and install desired applications through smart phones. For these reasons, smart phones have been widely distributed.

A primary advantage of the portable electric device is its portability since the portable electric device has a smaller size than that of a computing device of the related art, such as a desktop computer, a laptop computer or a notebook computer. However, due to this advantage, the portable electronic device has a limitation in the size of its display. In order to overcome this limitation, recent portable electronic devices have been implemented with a touch screen in which a display and an input means are combined. Despite this configuration, there remain the inconveniences that a user will experience while using various applications due to the relatively small display screen of the portable electronic device.

Therefore, a need exists for a method and an apparatus for displaying an application, such as a schedule, on a wearable additional electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure provides a method and an apparatus for displaying a schedule in an electronic device.

Another aspect of the present disclosure is to provide a method and an apparatus for displaying a user's schedule based on a current time in a pie chart type in a wearable additional device.

Another aspect of the present disclosure is to provide a method and an apparatus for displaying schedule data in a form of sector areas having an arc length or angle according to a time section of a corresponding schedule item in a wearable additional device.

In accordance with an aspect of the present disclosure, a method of displaying a schedule on a wearable additional device is provided. The method includes connecting a portable electronic device configured to synchronize a schedule, receiving a user input for displaying the schedule on a display screen of the wearable additional device, and displaying the schedule received from the portable electronic device on the display screen of the wearable additional device in response to the user input, wherein the schedule is displayed in a form of sector areas corresponding to a plurality of schedule items, and wherein each of the sector areas has an area proportional to a time of a corresponding schedule item from among a total time of schedule data which can be displayed on the display screen of the wearable additional device.

In accordance with another aspect of the present disclosure, a wearable additional device for displaying a schedule is provided. The wearable additional device includes a communication unit configured to connect a portable device which can synchronize the schedule, a display screen configured to display the schedule in a form of sector areas corresponding to a plurality of schedule items, and a controller configured to receive a user input for displaying the schedule on the display screen and displays the schedule received from the portable electronic device on the display screen in response to the user input, wherein each of the sector areas has an area proportional to a time of a corresponding schedule item from among a total time of schedule data which can be displayed on the display screen of the wearable additional device.

In accordance with another aspect of the present disclosure, a method of displaying a schedule on a wearable additional device connectable with a portable electronic device is provided. The method includes reconfiguring the schedule in a form which can be displayed on a display screen of the wearable additional device; and transmitting User Interface (UI) composition information indicating the reconfigured schedule to the wearable additional device, wherein the UI composition information corresponds to a plurality of schedule items and indicates sector areas arranged to be displayed on the display screen of the wearable additional device, and each of the sector areas has an area proportional to a time of a corresponding schedule item from among a total display time of schedule data which can be displayed on the display screen of the wearable additional device.

In accordance with another aspect of the present disclosure, a portable electronic device displaying a schedule on a wearable additional device is provided. The portable electronic device includes a controller configured to reconfigure the schedule in a form which can be displayed on a display screen of the wearable additional device; a communication unit configured to transmit UI composition information indicating the reconfigured schedule to the wearable additional device, wherein the UI composition information corresponds to a plurality of schedule items and indicates sector areas arranged to be displayed on the display screen of the wearable additional device, and each of the sector areas has an area proportional to a time of a corresponding schedule item from among a total time of schedule data which can be displayed on the display screen of the wearable additional device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The following various embodiments describe a technology that displays schedule data stored in a portable electronic device on an additional device.

Figure 1:
FIG. 1 illustrates a connection between a portable electronic device and an additional device according to an embodiment of the present disclosure.

FIG. 1 illustrates a connection between a portable electronic device and an additional device according to an embodiment of the present disclosure.

Referring to FIG. 1, a portable electronic device 100 and an additional device 110 may be connected with each other through a wireless communication technology, a Near Field Communication, or a wired cable. According to an embodiment, the portable electronic device 100 may be connected with the additional device 110 through a wireless communication technology such as Bluetooth, Bluetooth Low Energy (BLE), ZigBee, infrared communication, Wi-Fi Direct, home Radio Frequency (RF), Digital Living Network Alliance (DLNA), or the like. According to an embodiment, the portable electronic device 100 may be connected with the additional device 110 through a wired technology such as a High-Definition Multimedia Interface (HDMI) cable, a Universal Serial Bus (USB) cable, a micro/mini USB cable, an Audio-Video (AV) cable, or the like.

The portable electronic device 100 includes a display to execute a stored or downloaded application and may take various forms, such as a Personal Digital Assistant (PDA), a cellular phone, a smart phone, a tablet Personal Computer (PC), a Portable Multimedia Player (PMP), or the like. The portable electronic device 100 may display schedule data on the additional device 110 in a state where the portable electronic device 100 is connected with the additional device 110 wirelessly or through a wired cable and synchronized with the additional device 110.

The additional device 110 may display the schedule data provided by the portable electronic device 100. The additional device 110 may have a display having a size equal to, or relatively smaller than, a size of the display of the portable electronic device 100, and may be a device having high portability and user accessibility. For example, the additional device may be a device in a form of a wrist watch worn around a wrist, an earset remote control having a display means worn around a neck, or a wearable device attached to or worn on a head, an arm, a leg, or the body of the user. The additional device in the form of the wrist watch may have a communication function, such as Bluetooth, and may interact with a smart phone to support a function such as notification of a text message, a call, or an instant message. The additional device in the form of the wrist watch or the earset remote control may be included in the wearable device.

In various embodiments of the present disclosure, the schedule data refers to schedule items such as an appointment, work to do, an anniversary, or the like, input by the user. The additional device 110 may display one or more schedule items for an amount of time from a reference time in a form of circular segments or sector areas. Hereinafter, components and operations required for displaying schedule items on the additional device 110 will be described.

Figure 2:
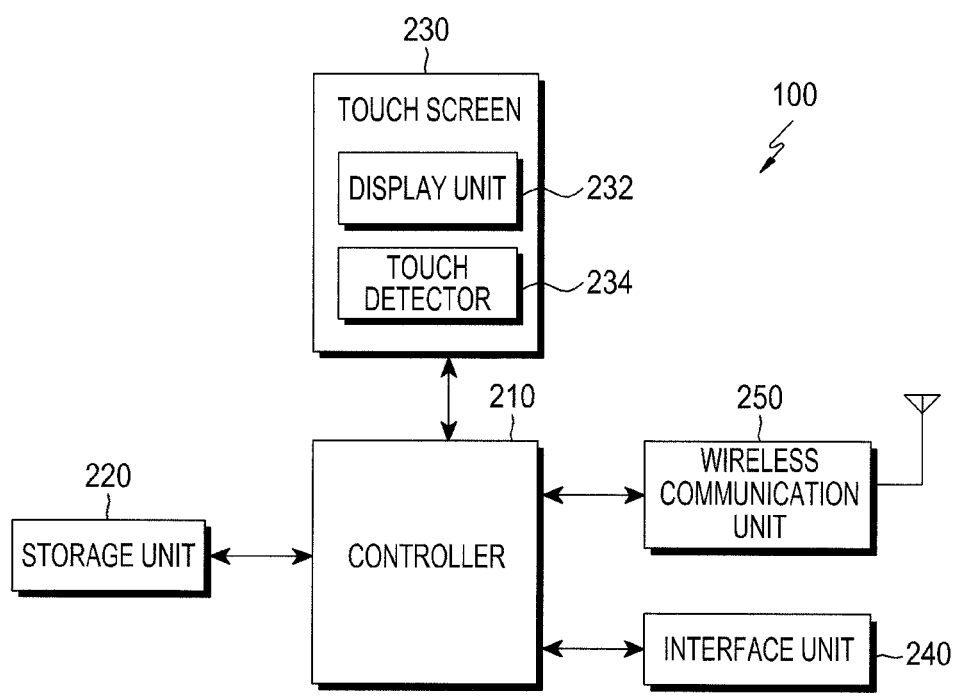
FIG. 2 is a block diagram illustrating a configuration of a portable electronic device according to an embodiment of the present disclosure.

FIG. 2 is a block diagram illustrating a configuration of a portable electronic device according to an embodiment of the present disclosure.

Referring to FIG. 2, the portable electronic device 100 may include a wireless communication unit 250, an interface unit 240, a touch screen 230, a storage unit 220, and a controller 210. The touch screen 230 may include a display unit 232 and a touch detector 234.

The wireless communication unit 250 may form wireless communication channels with other devices located within a communicable range under a control of the controller 210. More particularly, the wireless communication unit 250 according to an embodiment of the present disclosure may form a wireless communication channel with the additional device 110 and may transmit schedule data for a time range to the additional device 110 through the wireless communication channel. The wireless communication unit 250 may use a wireless communication technology such as Bluetooth, infrared communication, Wi-Fi, P2P, Wi-Fi Direct, home RF, DLNA, ZigBee, or the like.

The interface unit 240, which may be optionally implemented in embodiments, may include a wired cable for a wired connection with the additional device 110 and may transmit schedule data to the additional device 110 through the wired cable. Accordingly, the interface unit 240 may be formed by a USB, a micro/mini USB, an HDMI, a 20-pole connector, or the like. When the portable electronic device 100 does not provide an additional UI through a wired cable, the interface unit 240 may be omitted.

The touch screen 230 may perform an input function and an output function. For these functions, the touch screen 230 may include the display unit 232 for performing the output function and the touch detector 234 for performing the input function. The display unit 232 displays information on an application executed in the portable electronic device 100, information input by the user, and/or information to be provided to the user. For example, the display unit 232 may provide work areas for various applications such as a schedule management application and a note application, a picture viewer, and a game according to the use of the portable electronic device 100.

The touch detector 234 may generate an input event according to a contact or a detection of a user's finger or a stylus and transmit the generated input event to the controller 210. The touch detector 234 may recognize a change in a physical quantity (for example, capacitance, resistance, or the like) according to the contact or approach of the finger or the stylus, and transmit the input event including a type of the input and information on a position where the input is detected to the controller 210.

The storage unit 220 may store a program code required for operations according to an embodiment of the present disclosure, user data or the like. For example, the storage unit 220 may store a program that controls general operations of the portable electronic device 100, applications required for an Operating System (OS) booting the portable electronic device 100, and additional functions of the portable electronic device 100, such as a camera function, a sound play function, an image editing function, an image display function, a video play function, a wireless communication function, or the like. More particularly, the storage unit 220 may store schedule data including one or more schedule items input by the user under a control of the controller 210 and provide the schedule data when there is a request of the controller 210. In an embodiment, the storage unit 220 may store UI composition information indicating schedule data that is arranged in a form suitable for screen information of the additional device 110 (for example, a physical shape such as a rectangle, a circle, an oval, or a polygon, a resolution, or a size) under a control of the controller 210 and provide the UI composition information to the controller 210 when there is a request of the controller 210.

The controller 210 may control general operations of the portable electronic device 100 and a signal flow between components within the portable electronic device 100. More particularly, when there is a request of the additional device 110 or when another trigger condition for transmitting the schedule data is satisfied, the controller 210 may transmit schedule data input by the user to the additional device 110 through a schedule management application. In an embodiment, the controller 210 may reconfigure the schedule data in a form suitable for being displayed on the additional device 110 according to the screen information of the additional device 110, for example, a display shape, a size, and a resolution of the additional device 110, and may transmit UI composition information indicating the reconfigured schedule data to the additional device 110. Accordingly, the controller 210 may acquire the screen information of the additional device 110 from the additional device 110 directly or from an Internet manufacturer server through a connection (for example, Bluetooth pairing) with the additional device 110.

Although not illustrated in FIG. 2, the portable electronic device 100 may further include optional components for providing additional functions, such as a camera module for photographing an image or a video, a broadcasting reception module for receiving broadcasts, a digital music play module such as MPEG audio layer-3 (MP3), and a proximity sensor module for proximity sensing. All types of the components cannot be listed since a variation on the components varies greatly according to a convergence trend of digital devices, and the portable device 100 according to embodiments of the present disclosure may further include components in an equal level to that of the above listed components.

Figure 3:
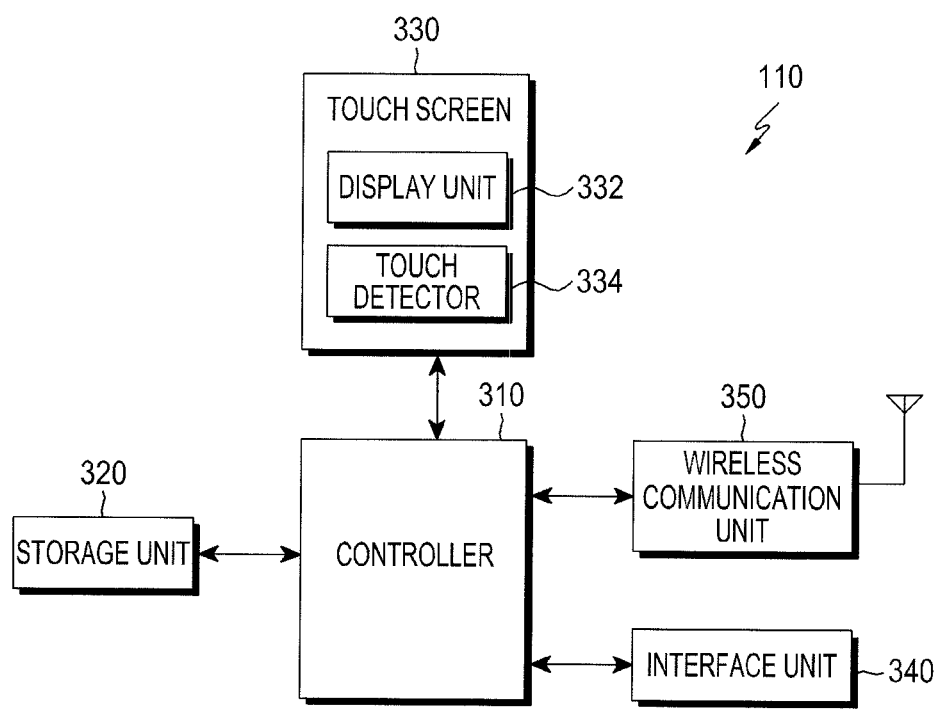
FIG. 3 is a block diagram illustrating a configuration of an additional device which may be connected with a portable electronic device according to an embodiment of the present disclosure.

FIG. 3 is a block diagram illustrating a configuration of an additional device which may be connected with a portable electronic device according to an embodiment of the present disclosure.

Referring to FIG. 3, similarly to the portable electronic device 100, the additional device 110 may include a wireless communication unit 350, an interface unit 340, a touch screen 330, a storage unit 320, and a controller 310, and the touch screen 330 may include a display unit 332 and a touch detector 334. The wireless communication unit 350 may form a wireless communication channel with the portable electronic device 100 under a control of the controller 310 and may receive schedule data from the portable electronic device 100 through the wireless communication channel. The interface unit 340, which may be optionally implemented in an embodiment, may include a wired cable for a wired connection with the portable electronic device 100 and receive schedule data from the portable electronic device 100 through the wired cable.

The touch screen 330 may include the display unit 332 for performing a screen output and the touch detector 334 for performing a screen input, and the display unit 332 displays information generated in the additional device 110, information input by the user and/or information to be provided to the user. For example, when the additional device 110 is a wrist watch, the display unit 332 may display a digital watch screen including digital numbers or an analog watch screen including a dial face and hour and minute hands. When there is the schedule data received from the portable electronic device 100 and a request for displaying the schedule from the user is detected, the controller 310 may display the schedule data on the display unit 332.

In an embodiment, the controller 310 graphically reconfigures schedule items for an amount of time from a reference time from among a plurality of items included in the schedule data to be identifiable from each other and displays the reconfigured schedule items on the display unit 332. The amount of time refers to a display range of the schedule data and may be called a total display time. In an embodiment, the controller 310 may display the schedule items in a form of sector areas having an arc length or a central angle according to a corresponding time section.

The touch detector 334 may generate an input event according to a contact or a detection of a user's finger or a stylus and may transmit the generated input event to the controller 310. The touch detector 334 may recognize a change in physical quantities (for example, capacitance, resistance, or the like) according to the contact or approach of the finger or stylus and transmit an input event including a type of the input and information on a position where the input is detected to the controller 310. The controller 310 may control a display of the schedule data based on the input event.

The storage unit 320 may store a program code required for operations according to an embodiment of the present disclosure, user data, or the like. For example, the storage unit 320 may store a program controlling general operations of the additional device 110, applications required for an Operating System (OS) booting the additional device 110, and functions of the additional device 110, for example, program codes required for executing a clock function, an alarm function, a notification function, or the like. Further, the storage unit 320 may store the schedule data received from the portable electronic device 100.

The controller 310 may control general operations of the additional device 110 and a signal flow between components within the additional device 110. More particularly, when there is schedule data provided from the portable electronic device 100 and a request for displaying the schedule from the user is detected, the controller 310 may display schedule items of the schedule data for each sector area on the display unit 332. Further, when a detection of a user input is notified from the touch detector 334, the controller 310 may control a display of the schedule data according to the user input.

Although not illustrated in FIG. 3, the additional device 110 may further optionally include components for providing additional functions such as at least one physical input unit, or the like, such as a speaker for outputting an audio signal, a motion sensor, a rotary or a crown of a wrist watch. The additional device 110 according to embodiments of the present disclosure may further include components in an equal level to that of the aforementioned components.

Figure 4:
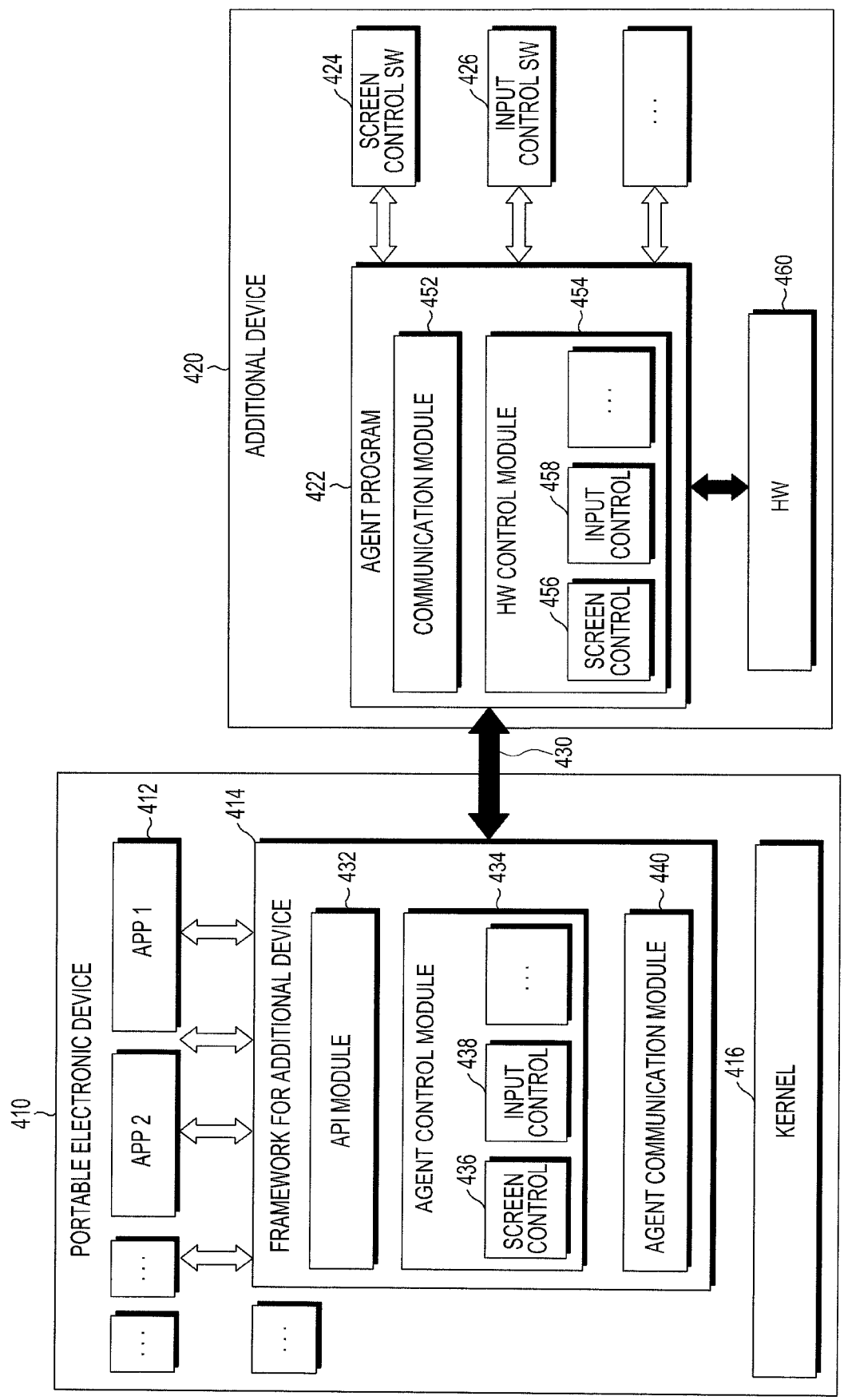
FIG. 4 illustrates a connection between a portable electronic device and an additional device according to an embodiment of the present disclosure.

FIG. 4 illustrates a connection between a portable electronic device and an additional device according to an embodiment of the present disclosure.

Referring to FIG. 4, a portable electronic device 410 refers to a main device including a schedule management application, and includes a plurality of executable applications 412 and a framework 414 for an additional device operated on a kernel 416. The framework 414 for the additional device communicates with the schedule management application which is one of the applications 412 and takes on communication with an additional device 420.

The portable electronic device 410 is connected with the additional device 420 by using a wireless or wired communication means 430. The additional device 420 includes an agent program 422 for communication between the portable electronic device 410 and the additional device 420 and one or more software execution blocks 424 and 426. The software execution blocks 424 and 426 may include screen control software 424 and input control software 426. The screen control software 424 displays information generated in the additional device 420 or schedule data provided from the portable electronic device 410 through the agent program 422 on a screen of the additional device 420, and the input control software 426 detects and processes information input through a touch screen of the additional device 420 or another input unit or transmits the information to the portable electronic device 410 through the agent program 422.

The framework 414 for the additional device within the portable electronic device 410 includes an Application Program Interface (API) module that communicates with the applications 412, an agent control module 434 that configures schedule data to be transmitted to the additional device 420 and receives and analyzes information transmitted from the additional device 420, and an agent communication module 440 that takes on communication with the agent program 422 of the additional device 420 according to a communication scheme connecting the portable electronic device 410 and the additional device 420. The agent control module 434 includes a screen control sub module 436 that configures schedule data to be transmitted to the additional device 420 and transmits the schedule data to the additional device 420 through the agent communication module 440, and an input control sub module 438 that analyzes information transmitted from the additional device 420 through the communication module 440 and transmits the information to the corresponding application 412.

API module 432 provides an interface which may use resources, such as an interface of controlling a screen of the additional device 420 and controlling an input. Accordingly, the API module 432 may use the agent control module 434. The agent control module 434 provides support allowing the portable electronic device 410 to use resources (e.g., a screen output, a touch input, or the like) of the additional device 420 through the sub modules 436 and 438 that take on controlling the screen of the additional device 420 and the touch input. The agent communication module 440 transmits a request of the application 412 transmitted through the agent control module 434 to the additional device 420 or transmits a user input from the additional device 420 to the corresponding application 412 through the agent control module 434.

The agent program 422 within the additional device 420 includes a communication module 452 communicating with the framework 414 for the additional device of the portable electronic device 410 and a hardware control module 454 controlling input/output hardware 560 of the additional device 420. The input/output hardware 460 includes output units such as a display or a touch screen and input units such as a touch screen, a motion sensor, or physical buttons. The hardware control module 454 includes a screen control sub module 456 displaying schedule data transmitted through the communication module 452 on a display or a touch screen of the input/output hardware 460 and an input control sub module 458 transmitting user input data detected through a touch screen or another input unit of the input/output hardware 460 to the portable electronic device 410 through the communication module 452.

The hardware control module 454 may perform receiving a request from the portable electronic device 410 and transmitting request information generated in the additional device 420 to the portable electronic device 410. The hardware control module 454 may be operated by using a device driver of an Operating System (OS) or directly approaching a hardware register according to a software structure of the additional device 420.

Figure 5:
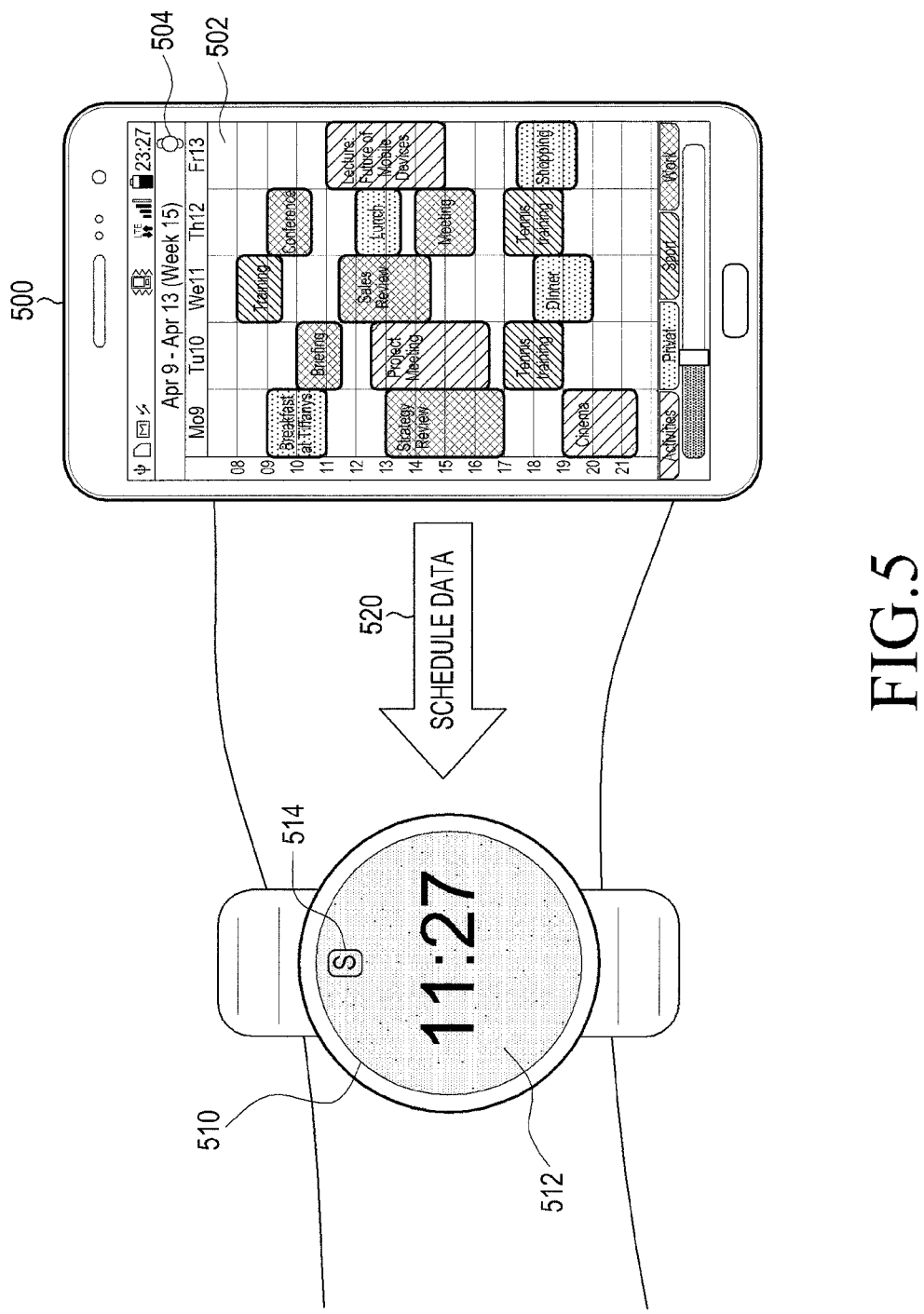
FIG. 5 illustrates transmission of schedule data according to an embodiment of the present disclosure.

FIG. 5 illustrates transmission of schedule data according to an embodiment of the present disclosure.

In FIG. 5, the portable electronic device is implemented by a smart phone and the additional device is implemented by a wrist watch wirelessly connected with the smart phone.

Referring to FIG. 5, a smart phone 500 executes a schedule management application 502 to sequentially display a plurality of schedule items according to date and time through the schedule management application 502. A wrist watch 510 is configured to display a watch screen 512 such as an analog type dial face or a digital type dial face and receives schedule data 520 for an amount of time from the smart phone 500. For example, the smart phone 500 may transmit schedule items corresponding to the schedule data 520 for six hours, for twelve hours, or for twenty-four hours to the wrist watch 510. In another example, a range of the transmitted schedule data 520 may be determined according to a range of schedule data displayed on the wrist watch 510. For example, when the wrist watch 510 is set to display schedule data for 6 hours, the wrist watch 510 may receive the schedule data for 6 hours from the current time or receive schedule data for six hours from the current time, may schedule data for six hours before the current time, and may schedule data for six hours starting six hours after the current time.

According to embodiments of the present disclosure, the schedule data 520 refers to schedule items such as an appointment, work to do, an anniversary, or the like, input by the user, and one schedule item includes a title, a start and end time, a memo, a schedule type, or the like. For example, the title may indicate a business meeting, a lunch discussion, a buyer meeting, a Spanish lesson, or the like, and the schedule type may be business, individual, family, anniversary, or the like.

In an embodiment, the smart phone 500 transmits the schedule data 520 for a time range to the wrist watch 510 when detecting a connection with the wrist watch 510. The time range of the transmitted schedule data 520 may be determined according to, for example, a range of schedule items displayed on the wrist watch 510 based on a setting. In an embodiment, the smart phone 500 displays an icon 504 for transmitting the schedule data through a menu area of the schedule management application 502 and transmits the schedule data 520 to the wrist watch 510 when a user input such as a touch is detected from the icon 504.

In an embodiment, when a user input making a request for displaying a schedule is detected, the wrist watch 510 is requested to transmit the schedule data 520. In an embodiment, the wrist watch 510 provides an icon 514 for displaying a schedule on the display screen and determines that a request for displaying the schedule is detected when a user input, for example, a touch is detected from the icon 514. In an embodiment, the wrist watch 510 displays a digital or analog dial face in a standby state, and displays at least a part of icons corresponding to executable applications in a list form when a user input such as a touch, a long-touch, or a long-press is detected from the dial face. When a user input is detected from an icon for executing a display of the schedule from among the displayed icons, the wrist watch determines that there is a request for the display of the schedule.

In an embodiment, the smart phone 500 may periodically transmit the schedule data 520 to the wrist watch 510 according to a period set by a manufacturer or user, for example, three hours, six hours, twelve hours, or the like. In an embodiment, when a new schedule item is input by the user or when a pre-input schedule item is changed, the smart phone 500 transmits the schedule data 520 including the new or changed schedule item to the wrist watch 510.

The schedule data 520 transmitted to the wrist watch 510 from the smart phone 500 may include, for example, schedule items for six hours or twelve hours before and after a current time. Amounts of the schedule data 520, that is, a time range of schedule items included in the schedule data 520 may be determined according to a setting of the user. For example, when the wrist watch 510 is set to display schedule items for six hours, the smart phone 500 may transmit the schedule data 520 including schedule items for six hours from a current time, schedule items from six hours later until twelve hours later, and schedule items for six hours before the current time to the wrist watch 510.

The schedule data 520 transmitted to the wrist watch 510 from the smart phone 500 may include UI composition information of schedule items reconfigured based on a physical shape (e.g., a circle, an oval, a rectangle, a polygon, or the like) of the wrist watch 510, a size, and screen information such as resolution.

Figure 6A:
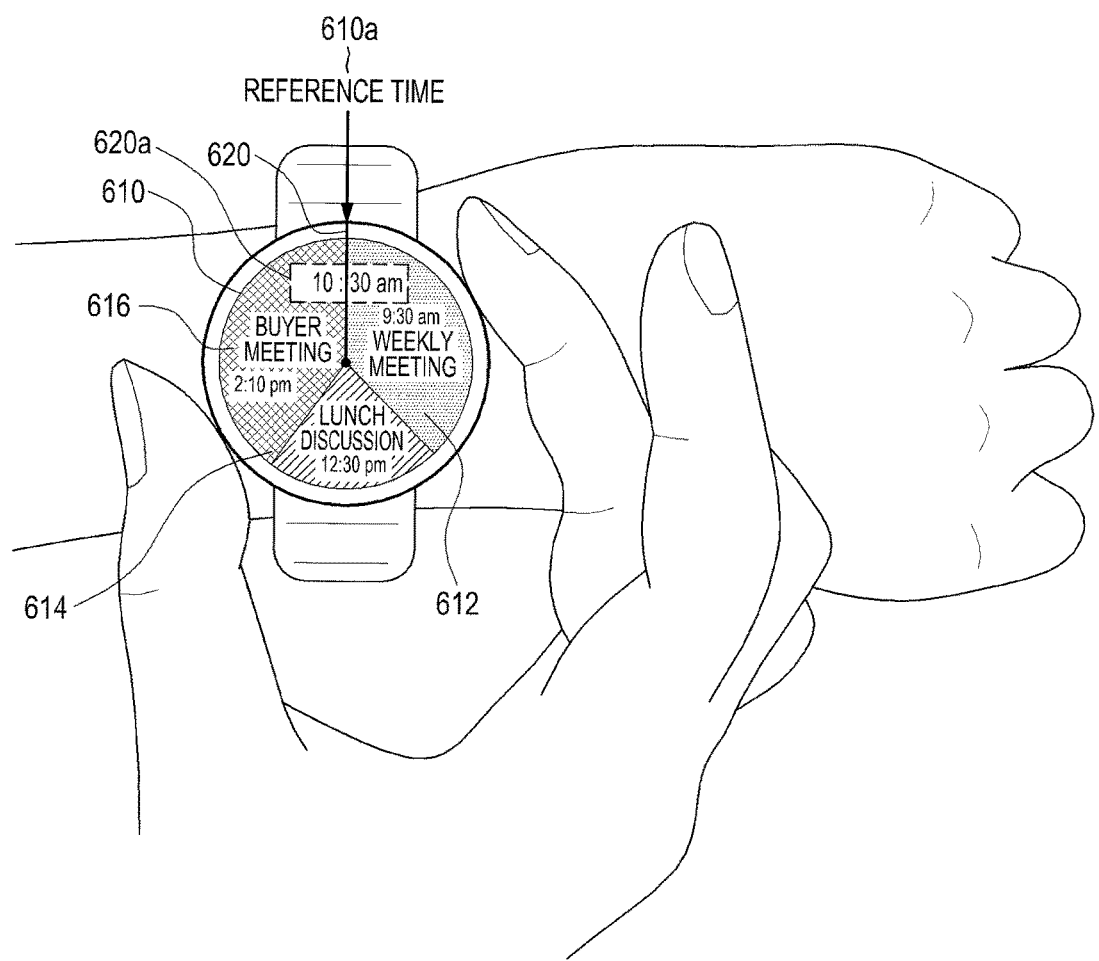
FIGS. 6A and 6B illustrate displays of schedule data on an additional device according to an embodiment of the present disclosure.
Figure 6B:
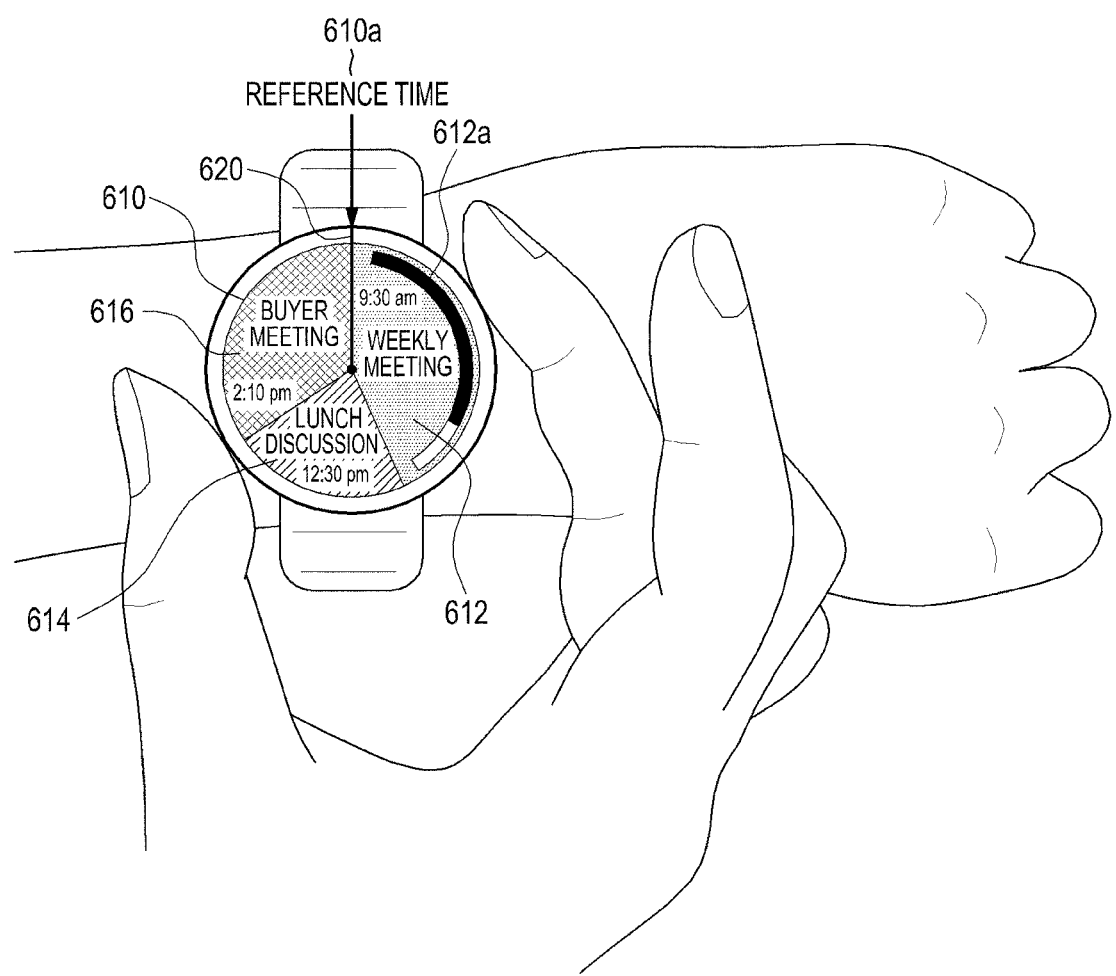

FIGS. 6A and 6B illustrate displays of schedule data on an additional device according to an embodiment of the present disclosure.

Referring FIGS. 6A and 6B, an example wherein the additional device is implemented as a wrist watch 610 will be described.

Referring to FIG. 6A, the wrist watch 610 displays a total display time from a reference time 610*a*, for example, one or more schedule items for six hours in a form of sector areas 612, 614 and 616. The sector areas 612, 614 and 616 corresponding to the schedule items are sequentially arranged on the display screen of the wrist watch 610 in a clockwise direction to form a pie chart. Each of the sector areas 612, 614 and 616 corresponding to one schedule item has a vertex which matches a center of the display screen of the wrist watch 610, has an arc of a length or an angle corresponding to a time section set for the corresponding schedule item, is are chronologically arranged in a clockwise direction. Accordingly, each of the sector areas 612, 614 and 616 may occupy a larger area within the pie chart as a time section set for the corresponding schedule item is larger.

The time section is determined by a start time and an end time set for the corresponding schedule item. In the shown example, the sector area 612 corresponds to a schedule item indicating a "weekly meeting" set to start at 9:30 am and end at 12:30 pm, the sector area 614 corresponds to a schedule item indicating a "lunch discussion" set to start at 12:30 pm and end at 2:10 pm, and the sector area 616 corresponds to a schedule item indicating a "buyer meeting" set to start at 2:10 pm.

The first sector area 612 corresponds to a schedule item including the current time and is arranged to start at 12:00 indicating the reference time 610*a*. In an embodiment, the sector area 612 has an arc of a length corresponding to the time section from the current time to 12:30 pm which is the end time, that is, the remaining time of the current schedule item. In an embodiment, the wrist watch 610 may further display a reference line in a bar shape formed from a center of the display screen to a position corresponding to the current time in order to allow the user to easily identify the current time. When the reference time 610*a* is the current time, the reference line 620 is directed toward 12:00. In addition, a text character string 620*a*, for example, "10:30 am" indicating the current time may be displayed on the reference line 620 or near the reference line 620.

FIG. 6B illustrates an embodiment of the present disclosure in which the sector area 612 has an arc of a length corresponding to a time section from 9:30 am which is a start time to 12:30 pm which is an end time of a corresponding schedule time. In this case, the sector area 612 may include a progress bar 612*a* (for example, an arc type) indicating a progress state of the corresponding schedule item, and the progress bar 612*a* visually displays the current time from among entire time sections of the corresponding schedule item. Although not illustrated, the text character string 620*a* indicating the current time, for example, "10:30 am" may be additionally displayed near the reference line 620 like in FIG. 6A.

When an end time of the last section area 616 is later than six hours after the current time, an arc of the last sector area 616 may have a length smaller than a length corresponding to a time section of the corresponding schedule item.

Each of the sector areas 612, 614 and 616 is detailed information on the corresponding schedule item and may include a text character string indicating at least one of a start time, an end time, and a title. In the shown example, each of the sector areas 612, 614 and 616 includes text character strings such as the start time and the title. In an embodiment, the sector areas 612, 614 and 616 may be visually distinguished to be identifiable from each other. In an embodiment, the sector areas 612, 614 and 616 may have different colors according to a schedule type set for the corresponding schedule item, for example, a business appointment, an individual appointment, a family appointment, an anniversary function, or the like.

In an example of FIG. 6, the wrist watch 610 chronologically displays the sector areas 612, 614 and 616 corresponding to schedule items for six hours from the current time not to overlap each other according to a setting.

Figure 7A:
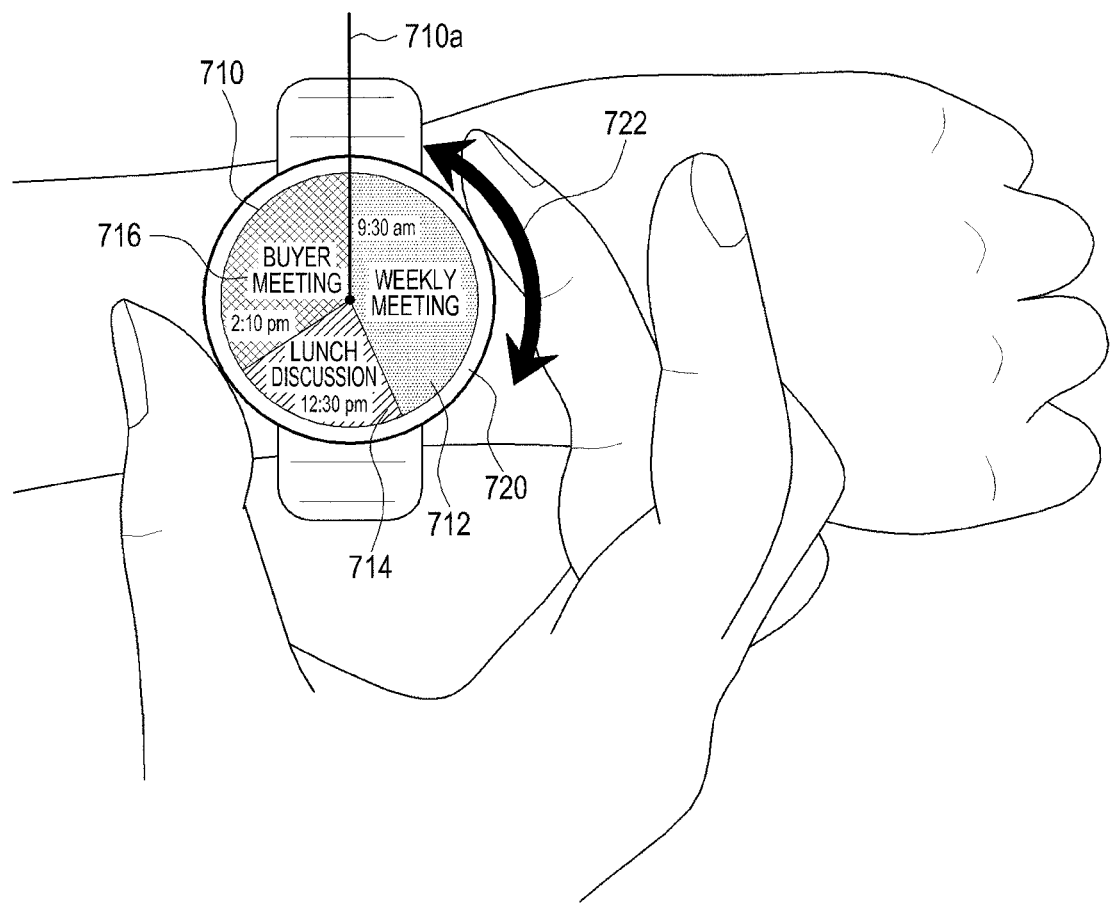
FIGS. 7A, 7B and 7C illustrate examples of changing a display of schedule data on an additional device according to an embodiment of the present disclosure.
Figure 7B:
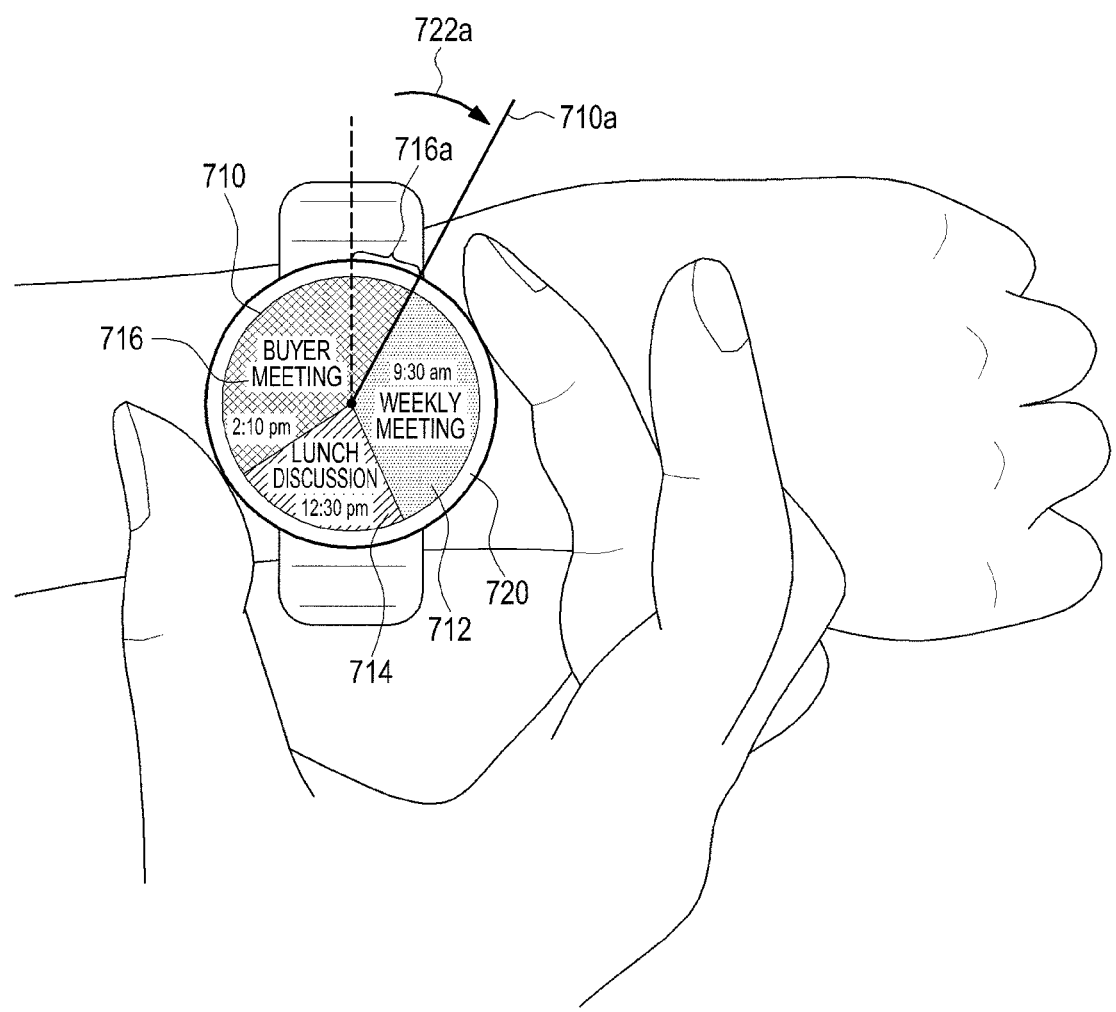
Figure 7C:
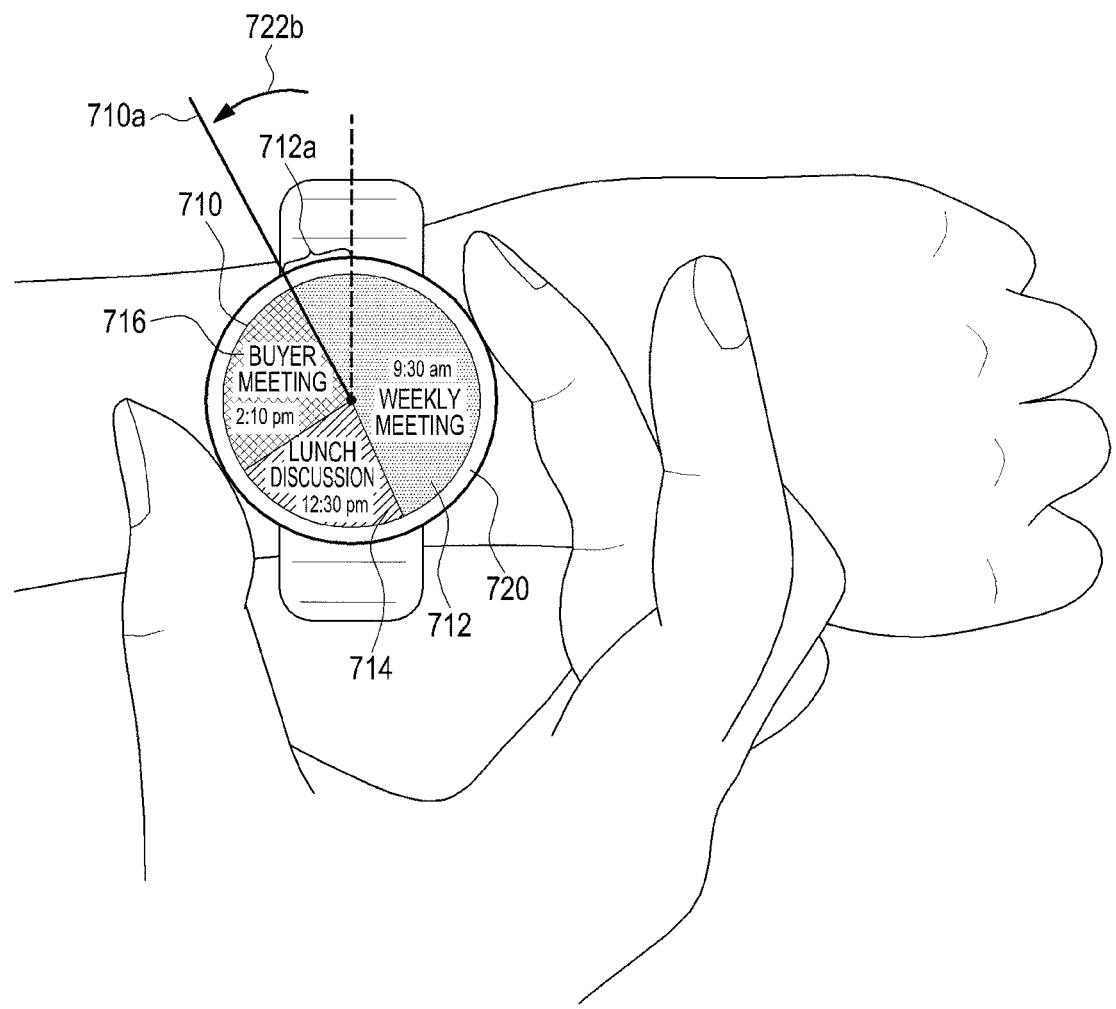

FIGS. 7A, 7B and 7C illustrate examples of changing a display of schedule data on an additional device according to an embodiment of the present disclosure.

Referring to FIGS. 7A, 7B and 7C, an example wherein the additional device is implemented as a wrist watch 710 will be described.

Referring to FIG. 7A, the wrist watch 710 includes a rotary 720 configured to rotate along a circumference of the display screen having a circular shape and may change a reference time for displaying schedule data according to a rotation of the rotary 720. First, the wrist watch 710 sequentially displays sector areas 712, 714, and 716 corresponding to one or more schedule items for an amount of time from a current time in a circular form, and additionally displays a reference line 710*a* corresponding to 12:00 indicating the current time. At this time, the reference time becomes the current time.

When a rotation 722 of the rotary 720 is detected, the wrist watch 710 changes the reference time according to a direction of the rotation 722, rotates the reference line 710*a* in a direction pointing to the changed reference time, and accordingly additionally displays schedule data before or after the reference time.

Referring to FIG. 7B, when a rotation 722*a* of the rotary in a clockwise direction is detected, the wrist watch 710 performs a circular movement of the reference line 710*a* by an amount of the rotation 722*a* in a clockwise direction. As the reference line 710*a* is moved as described above, the remaining parts 716*a* of the last sector area 716 are additionally displayed, and the additionally displayed parts 716*a* are displayed while covering at least a part of the first sector area 712. Although not illustrated, when the rotary 720 has a larger rotation 722*a*, at least one next section area following the last sector area 716 may be additionally displayed within a range which does not exceed the reference time 710*a*. When no next schedule data to be displayed according to the rotation 722*a* of the rotary 720 is stored in the wrist watch 710, the wrist watch 710 may make a request for additionally transmitting the corresponding schedule data to the smart phone (not shown).

Total amounts of the additionally displayed parts 716*a* (and the next sector area) are determined according to an amount of a rotation of the rotary 720. For example, when a total display time is set to six hours and the rotary 720 rotates by 120 degrees (i.e., 360 degrees/3) in a clockwise direction, the wrist watch 710 may additionally display an area corresponding to schedule data for two hours (i.e., six hours/3) after the total display time. At least one front sector area 712 of the displayed sector areas 712, 714 and 716 may be hidden by the additionally displayed area.

Referring to FIG. 7C, when a rotation 722*b* of the rotary 720 in a counterclockwise direction is detected, the wrist watch 710 performs a circular movement of the reference line 710*a* by an amount of the rotation 722*b* in a counterclockwise direction. As the reference line 710*a* is moved as described above, a previous part of the first section area 712 is additionally displayed and a part of the last section area 716 is hidden by the additionally displayed part 712*a*. Although not illustrated, when the rotary 720 has a larger rotation 722*b*, at least one sector area prior to the first sector area 712 may be additionally displayed within a rage which does not exceed the reference line 710*a*. When no previous schedule data to be displayed according to the rotation 722*b* of the rotary 720 is stored in the wrist watch 710, the wrist watch 710 may make a request for additionally transmitting the corresponding schedule data to the smart phone (not shown).

Total amounts of the additionally displayed area 712*a* (and the previous sector area) are determined according to an amount of a rotation of the rotary 720. For example, when a total display time is set to six hours and the rotary 720 rotates by 120 degrees (i.e., 360 degrees/3) in a clockwise direction, the wrist watch 710 may additionally display an area corresponding to schedule data for two hours (i.e., six hours/3) before the total display time. At least one last sector area 716 of the displayed sector areas 712, 714 and 716 may be hidden by the additionally displayed area.

Figure 8:
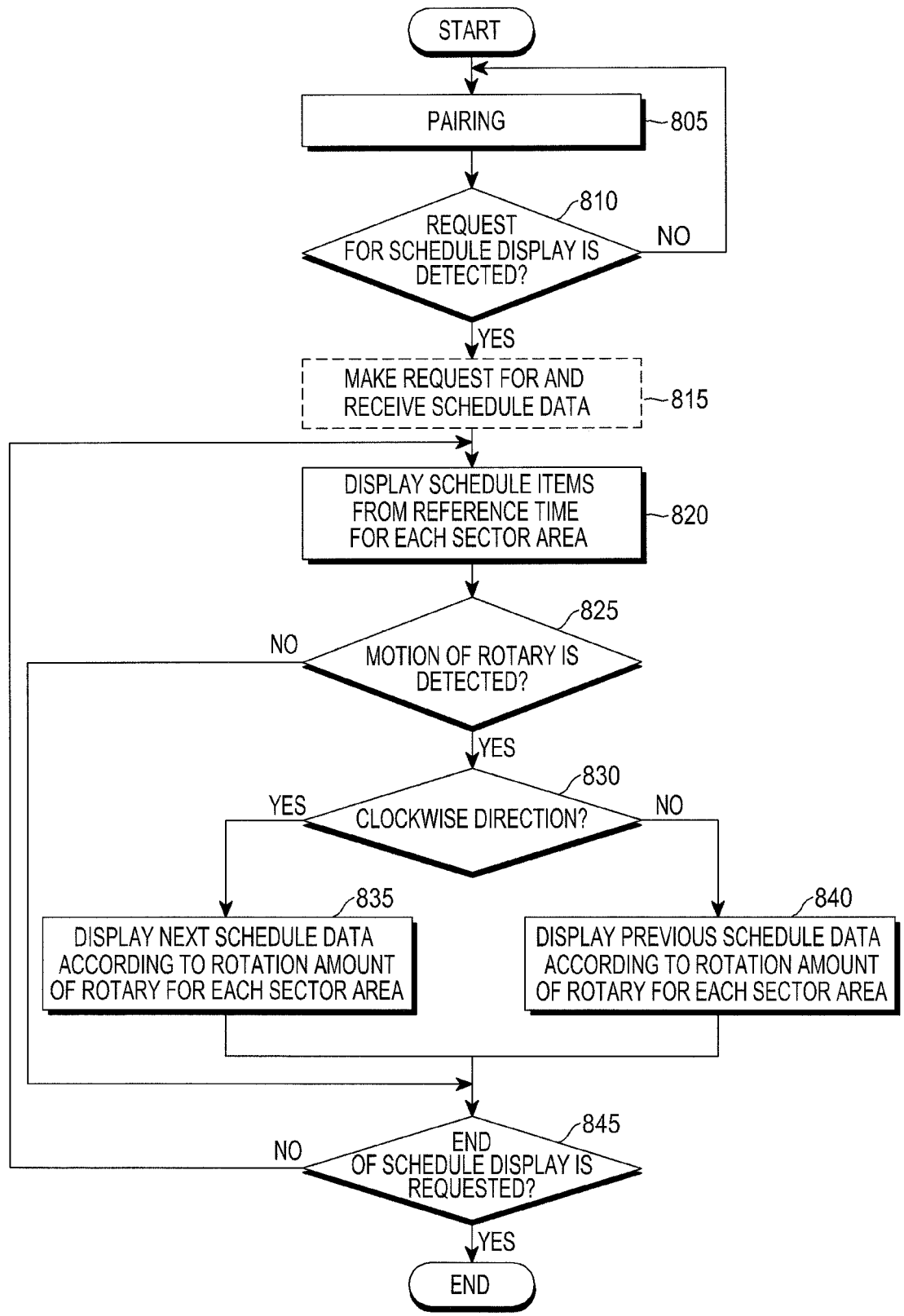
FIG. 8 is a flowchart illustrating a process of displaying schedule data on an additional device according to an embodiment of the present disclosure.

FIG. 8 is a flowchart illustrating a process of displaying schedule data on an additional device according to an embodiment of the present disclosure.

In FIG. 8, an example where the additional device is implemented as a wrist watch will be described.

Referring to FIG. 8, the wrist watch recognizes and pairs with a communicable portable electronic device at operation 805. In an embodiment, when the wrist watch identifies a password and completes an authentication between the wrist watch and the portable electronic device, the wrist watch determines that communication with the portable electronic device is possible. In an embodiment, when Bluetooth is used for a wireless connection with the portable electronic device, the wrist watch has made a pairing with the portable electronic device by using Bluetooth.

The wrist watch determines whether a user input making a request for displaying a schedule is detected at operation 810. In an embodiment, the wrist watch provides an icon for executing a schedule display application on a display screen, and determines that a schedule display request is detected when a user input, for example, a touch is detected from the icon. In an embodiment, the wrist watch displays a dial face in a standby state, and displays at least a part of icons corresponding to executable applications in a list form when a user input such as a touch, a long-touch, or a long-press is detected from the dial face. When a user input is detected from an icon for executing the schedule display application from among the displayed icons, the wrist watch determines that there is a request for displaying the schedule.

Operation 815 may be optionally performed when there is the request for displaying the schedule. That is, when the request for displaying the schedule is detected and there is no stored schedule data, the wrist watch makes a request for transmitting schedule data to the portable electronic device which has been synchronized with the wrist watch and receives schedule data including schedule items for an amount of time from the portable electronic device. In an example of FIG. 5, the smart phone 500 may transmit schedule items corresponding to the schedule data 520 for six hours, twelve hours, and twenty-four hours to the wrist watch 510. In another example, a range of the transmitted schedule data 520 may be determined according to a range of the schedule data displayed on the wrist watch 510. When there is stored schedule data, that is, when the wrist watch 510 is synchronized with the smart phone 500, operation 815 may be omitted.

At operation 820, the wrist watch displays sector areas corresponding to schedule items for an amount of time from a reference time, for example, for six hours on the display screen. The sector areas are arranged on the display screen to form a circle, and each of the sector areas has an arc of a length or an angle corresponding to a time section set for the corresponding schedule item.

The wrist watch determines whether a motion of the rotary is detected at operation 825. When the motion of the rotary is detected, the wrist watch determines whether the rotary rotates in a clockwise or counterclockwise direction at operation 830. When the rotary rotates in the clockwise direction, the wrist watch displays a section area corresponding to at least one next schedule item according to an amount of the rotation of the rotary on the display screen at operation 835. The sector area corresponding to the next schedule item is displayed just behind the sector area corresponding to the previous schedule item. When the rotary rotates in the counterclockwise direction, the wrist watch displays a sector area corresponding to at least one previous schedule item according to an amount of the rotation of the rotary on the display screen at operation 840. The sector area corresponding to the previous schedule item is displayed in front of the sector area corresponding to the schedule item of the current time.

At operation 845, the wrist watch determines whether to end the display of the schedule. In an embodiment, when a user input instructing to end the display of the schedule is detected, the wrist watch ends displaying of sector areas corresponding to schedule items. In an embodiment, when the connection with the portable electronic device is disconnected or when the wrist watch receives a command instructing to end the display of the schedule from the portable electronic device, the wrist watch ends displaying of sector areas corresponding to schedule items and may execute a function. In one example, the wrist watch may display a watch screen according to the function.

Figure 9:
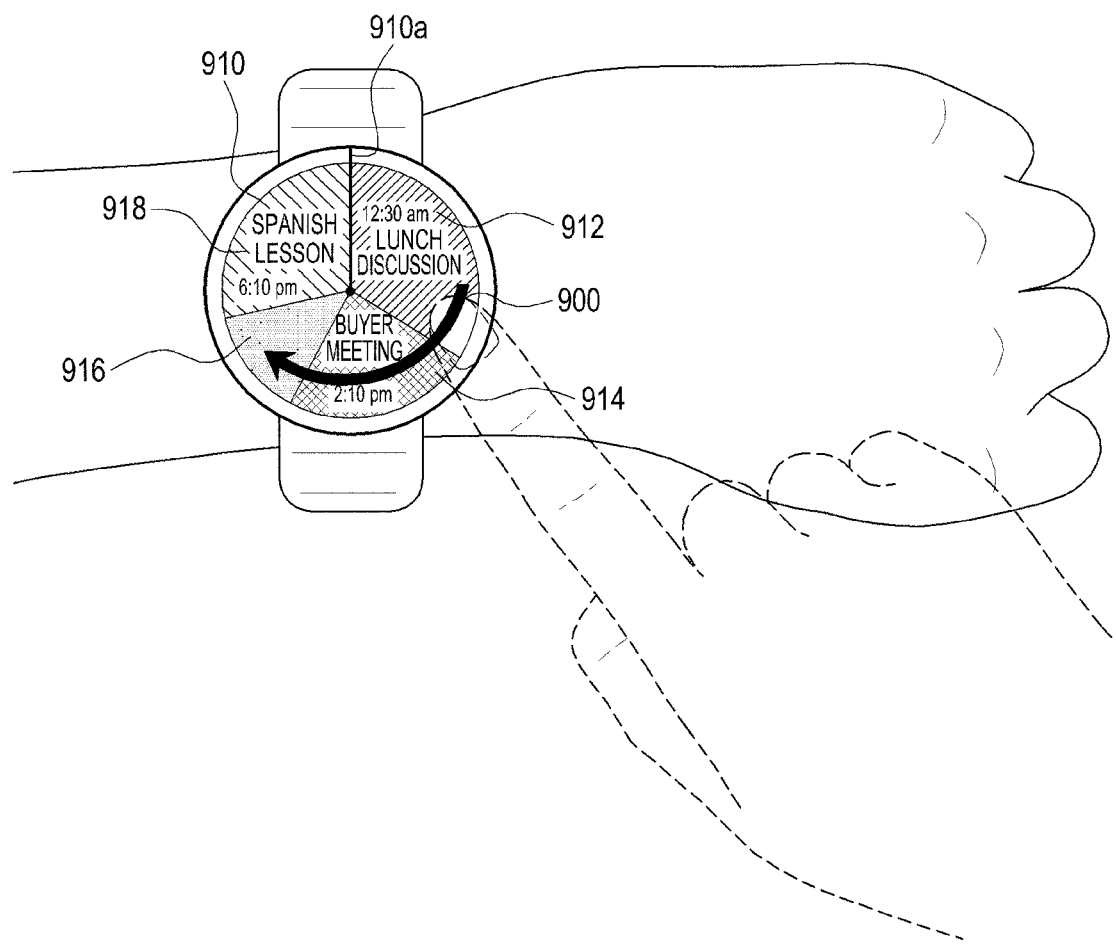
FIG. 9 illustrates an example of changing a display of schedule data on an additional device according to an embodiment of the present disclosure.

FIG. 9 illustrates an example of changing a display of schedule data on an additional device according to an embodiment of the present disclosure.

Referring to FIG. 9, an example wherein the additional device is implemented as a wrist watch 810 which does not have a rotary will be described.

Referring to FIG. 9, a wrist watch 910 may have a display screen in a circular shape, an oval shape, a rectangular shape, or a random shape and may display sector areas 912, 914, 916 and 918 corresponding to schedule items for an amount of time from a reference time in a circular form in response to a request for displaying the schedule, and outer lines of the sector areas 912, 914, 916 and 918 may have a random shape according to the shape of the display screen. In addition, a reference line 910a pointing 12:00 may be displayed on the display screen of the wrist watch 910 to indicate a current time. When a user input 900, for example, a drag in a circular direction (that is, a circular movement) after a long-press is detected from the display screen, the wrist watch 910 additionally displays previous or next schedule data according to the direction of the circular movement.

In an embodiment, when the long-press is detected from the remaining areas except for a center of the display screen, the wrist watch 910 processes the display screen to dim and waits for the circular movement. In an embodiment, when the long-press is detected from a reference line 910a, the wrist watch 910 processes the display screen to dim and waits for the circular movement. When a circular movement in a clockwise direction after the long-press is detected, the wrist watch 910 additionally displays schedule data after a displayed last sector area 918, for example, the remaining parts of the last sector area 918 or a sector area corresponding to the next schedule data to follow the reference line 910a while performing the circular movement of the reference line 910a in the clockwise direction (see FIG. 7B).

Similarly, when a circular movement in a counterclockwise direction after the long-press is detected, the wrist watch 910 additionally displays schedule data before a displayed first sector area 912, for example, a front part of the first sector area 912 or a sector area corresponding to the previous schedule data to follow the reference line 910a while performing the circular movement of the reference line 910a in the counterclockwise direction (see FIG. 7C).

Figure 10:
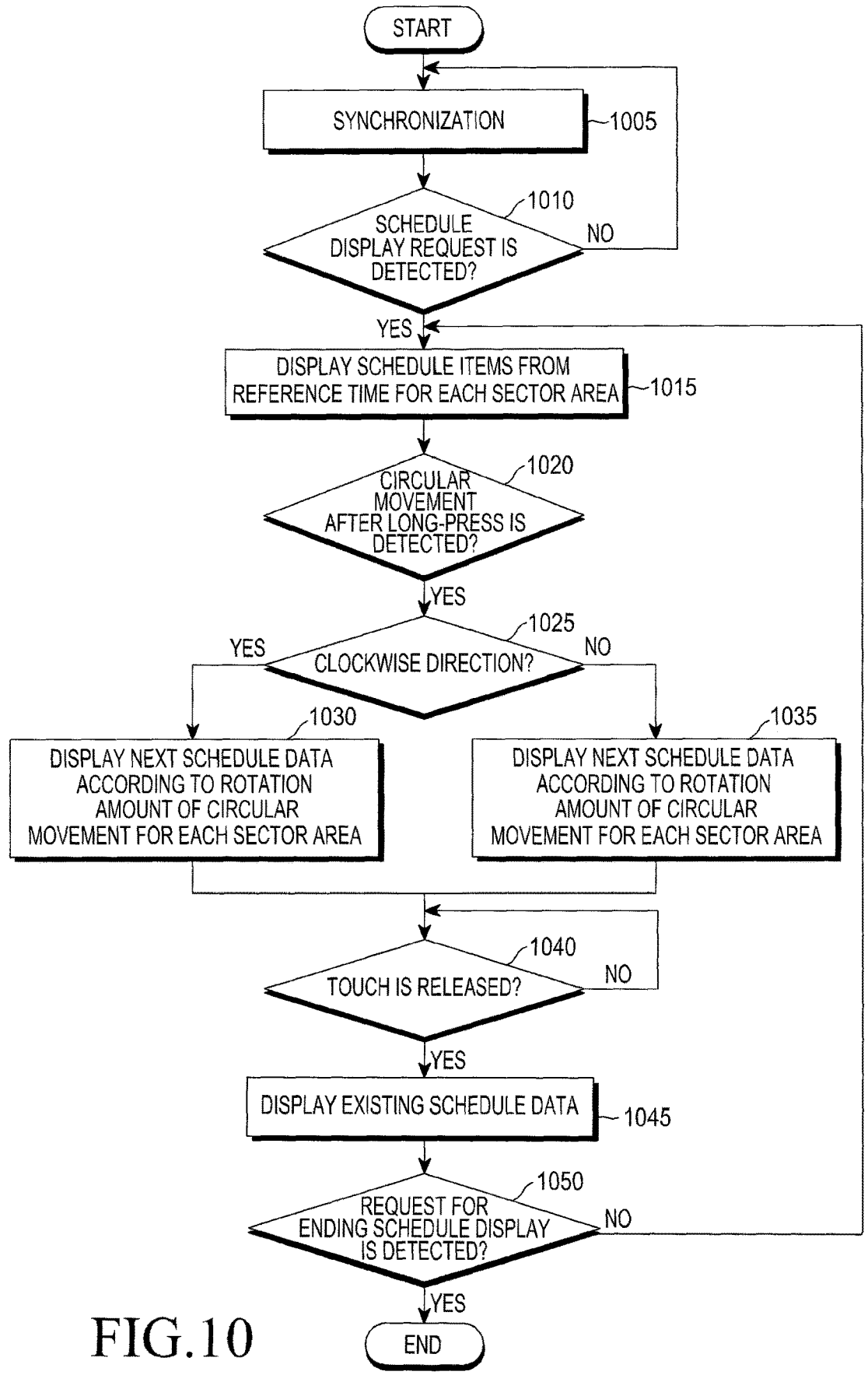
FIG. 10 is a flowchart illustrating a process of changing schedule data displayed on an additional device according to an embodiment of the present disclosure.

FIG. 10 is a flowchart illustrating a process of changing schedule data displayed on an additional device according to an embodiment of the present disclosure.

Referring to FIG. 10, an example wherein the additional device is implemented as the wrist watch will be described.

Referring to FIG. 10, the wrist watch is synchronized with the portable electronic device by using, for example, Bluetooth at operation 1005. That is, the wrist watch has schedule data synchronized with the portable electronic device. When the wrist watch receives a request for displaying the schedule from the user at operation 1010, the wrist watch displays sector areas corresponding to schedule items for a total display time from a reference time on the display screen in a circular form at operation 1015. Each of the sector areas has an arc of a length or an angle corresponding to a time sector set for the corresponding schedule item.

The wrist watch detects a circular movement after a long-press from the display screen at operation 1020, and determines whether the circular movement is performed in a clockwise direction or a counterclockwise direction at operation 1025. When the circular movement is performed in the clockwise direction, the wrist watch sequentially displays sector areas corresponding to next schedule items according to a rotation amount of the circular movement after the displayed last sector area at operation 1030. In contrast, when the circular movement is performed in the counterclockwise direction, the wrist watch displays sector areas corresponding to previous schedule items according to a rotation amount of the circular movement in an inverse order before the displayed first sector area at operation 1035.

At operation 1040, the wrist watch determines whether a touch release, that is, a "detouch," is detected after the circular movement. When the touch release is detected, the wrist watch displays again the original sector areas corresponding to the original schedule items of operation 1015 at operation 1045. The original sector areas may be returned to have an original arrangement while rotating in a direction opposite to the rotation direction of operation 1030 or 1035 in response to the touch release. In an embodiment, the wrist watch may maintain sector areas displayed at the time when the touch release is detected, in response to the touch release at operation 1045.

The wrist watch determines to end the display of the schedule at operation 1050. When a command instructing to end the display of the schedule is detected, the wrist watch removes the displayed sector areas from the display screen, and executes a function, for example, a function of displaying a watch screen.

Figure 11A:
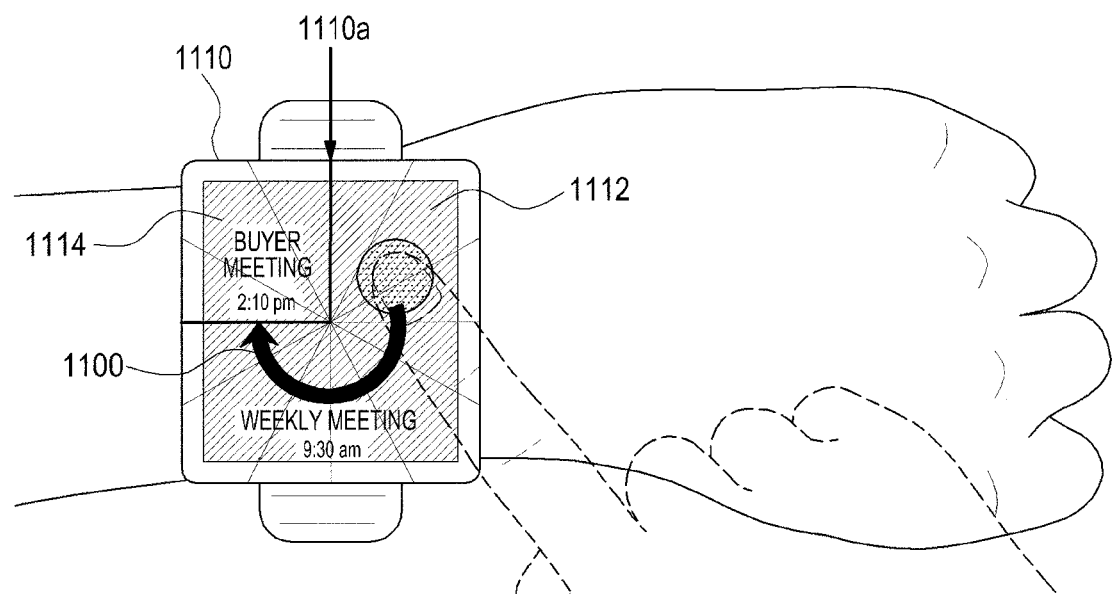
FIGS. 11A and 11B illustrate displays of schedule data on an additional device according to an embodiment of the present disclosure.
Figure 11B:
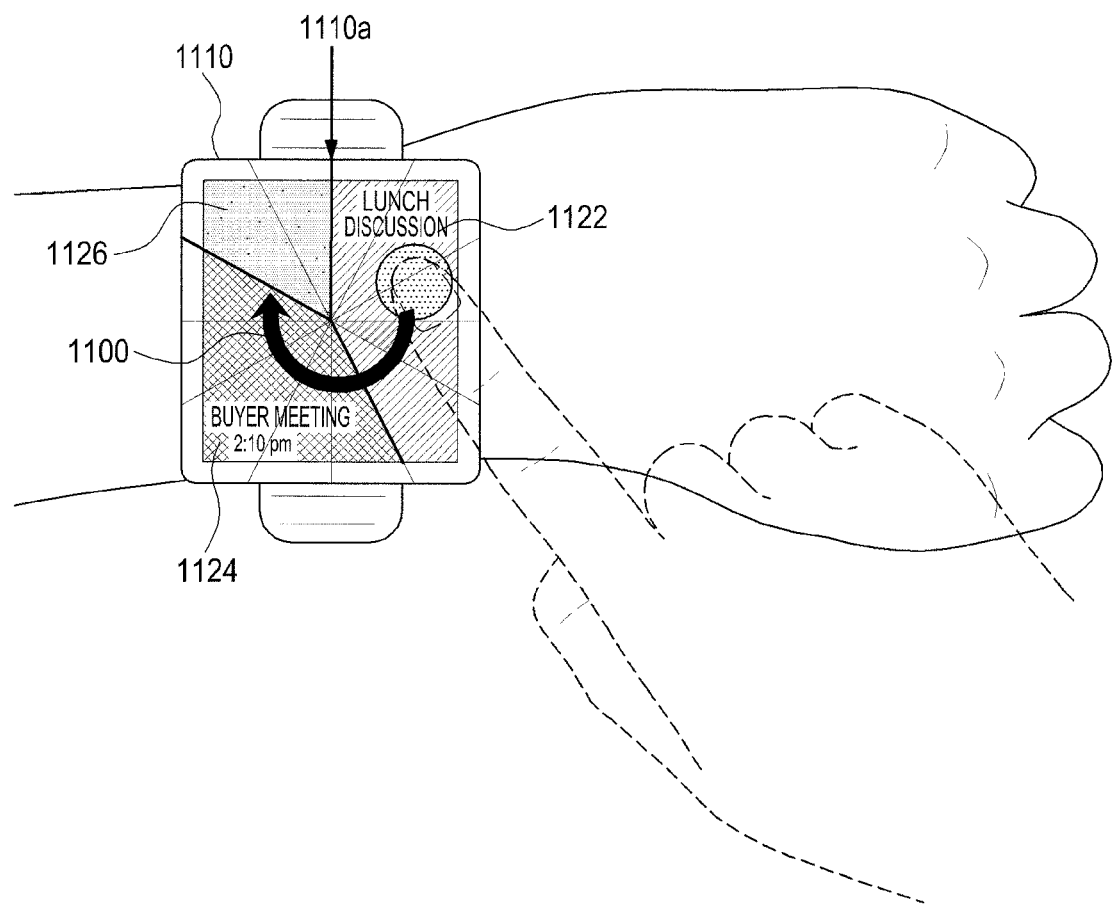

FIGS. 11A and 11B illustrate displays of schedule data on an additional device according to an embodiment of the present disclosure.

Referring to FIGS. 11A and 11B, the additional device is implemented as a wrist watch 1110 having a display screen of a rectangular type.

Referring to FIG. 11A, the wrist watch 1110 displays sector areas 1112 and 1114 corresponding to schedule items for a total display time from a reference time 1110*a* (for example, a current time), for example, for four hours on the display screen. The sector areas 1112 and 1114 corresponding to the schedule items are arranged on the display screen of the wrist watch 1110 in a circular form. In an embodiment, each of the sector areas 1112 and 1114 corresponding to one schedule item has a vertex which matches a center of the screen of the wrist watch 1110 and has an angle corresponding to a time sector set for the corresponding schedule item, and the sector areas 1112 and 1114 are chronologically arranged in a clockwise direction. The time section is defined by a start time and an end time set for the corresponding schedule item.

The first sector area 1112 corresponds to a schedule item including the current time and is arranged to start at 12:00 indicating a reference time 1110*a*. In the shown example, the sector area 1112 corresponds to a schedule item indicating a "weekly meeting" set to start at 9:30 am and end at 12:30 pm, and occupies first, third, and fourth quadrants of the screen of the wrist watch 1110. The sector area 1114 corresponds to a schedule item indicating a "lunch discussion" set to start at 12:30 pm and end at 2:10 pm, and occupies only the second quadrant of the screen of the wrist watch 1110.

Similar to the example of FIG. 9, when the wrist watch 1110 detects a user input 1100, for example, a circular movement, after a long-press from the display screen, the wrist watch 1110 additionally displays schedule data corresponding to next or previous schedule items.

Referring to FIG. 11B, the wrist watch 1110 sequentially displays sector areas 1122, 1124 and 1126 corresponding to schedule items for a total display time from a reference time 1110*a* (for example, a current time), for example, for six hours on the display screen in a clockwise direction. The first sector area 1122 corresponds to a schedule item including the current time and is arranged to start at 12:00 corresponding to the reference time 1110*a*. In the shown example, the sector area 1122 is arranged between 12:00 to 5:00, the sector area 1124 is arranged between 5:00 and 10:00, and the sector area 1126 is arranged between 10:00 and 12:00.

Similarly, the user performs a long-press and then a circular movement 1100 on the display screen of the wrist watch 1110, by using a finger (or another touch means) to display next or previous schedule items on the wrist watch 1110.

Figure 12:
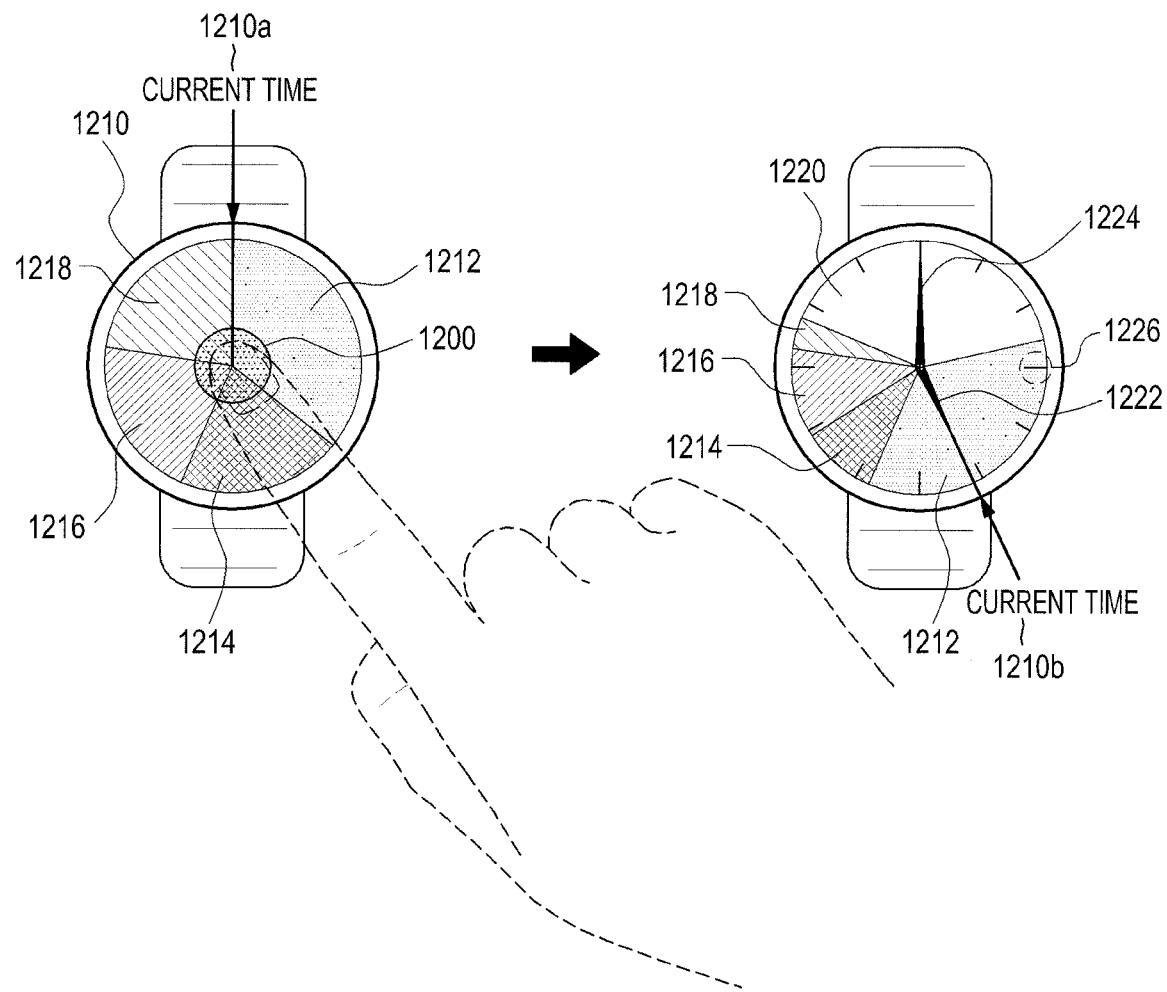
FIG. 12 illustrates an operation of changing a view mode of schedule data in a wrist watch according to an embodiment of the present disclosure.

FIG. 12 illustrates an operation of changing a view mode of schedule data in a wrist watch according to an embodiment of the present disclosure.

Referring to FIG. 12, a wrist watch 1210 arranges and displays sector areas 1212, 1214, 1216 and 1218 corresponding to schedule items for a total display time from 12:00 indicating a current time 1210*a* on the display screen in a circular form in a clockwise direction. As described above, a view mode that designates a reference of 12:00 as the current time 1210*a* is referred to as a now view mode in this specification.

When a user input 1200, for example, a touch (or one click) is detected from a center area of the display screen of the wrist watch 1210, the wrist watch 1210 changes the view mode to a daily view mode. The center area may be defined as an area including a middle point of the display screen of the wrist watch 1210. In the daily view mode, sector areas 1212, 1214, 1216, 1218 and 1220 corresponding to schedule items for twelve hours from the current time start at a position 1210*b* are indicated by an hour hand corresponding to the current time and are sequentially arranged in a clockwise direction.

In the view mode of the schedule data, the wrist watch 1210 may display a watch screen including a dial face 1226 and an hour hand/minute hand 1222/1224 below the sector areas 1212 to 1220, and may further display a reference line in a thick bar form in the hour hand position 1210*b* corresponding to the current time. In order to allow the user to more easily recognize the sector areas 1212 to 1220, watch screens 1222, 1224 and 1226 may be translucently displayed. In an embodiment, the sector areas 1212 to 1220 may be translucently displayed instead of the watch screens 1222, 1224 and 1226.

Figure 13:
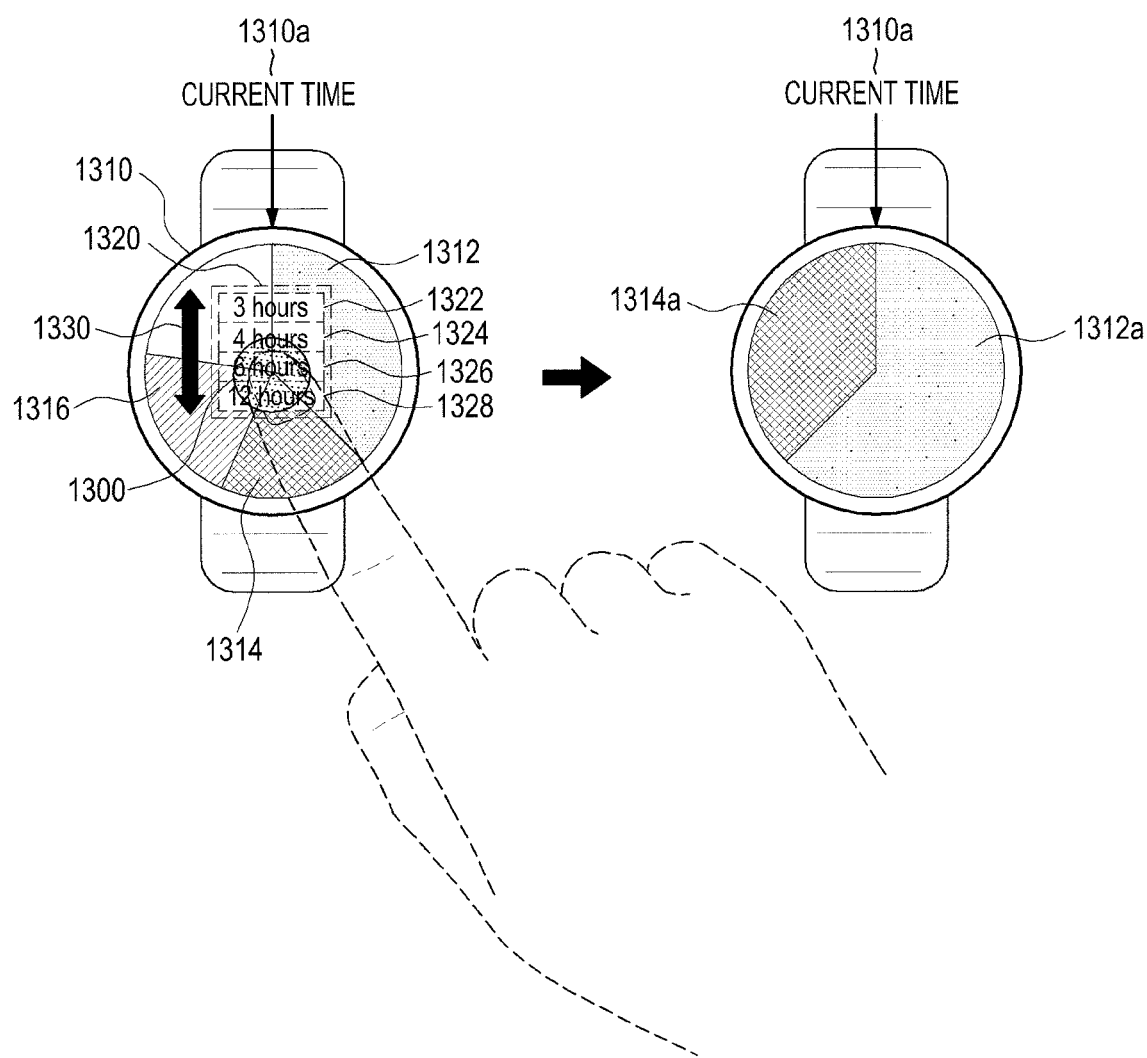
FIG. 13 illustrates an operation of changing a total display time of schedule data in a wrist watch according to an embodiment of the present disclosure.

FIG. 13 illustrates an operation of changing a total display time of schedule data in a wrist watch according to an embodiment of the present disclosure.

Referring to FIG. 13, a wrist watch 1310 arranges and displays sector areas 1312, 1314 and 1316 corresponding to schedule items for six hours from 12:00 corresponding to a current time 1310*a* on the display screen of the wrist watch 1310 in a circular form. When the user desires to change the total display time indicating a range of the schedule data to be displayed, the user performs a user input 1300, for example, a long-press on a center area of the wrist watch 1310.

When the user input 1300 corresponding to the long-press is detected from the center area of the wrist watch 1310, the wrist watch 1310 displays a menu window 1320 for changing the total display time on the display screen. For example, the menu window 1320 may be displayed on a dial face in a popup window form. The menu window 1320 includes a plurality of menu items 1322, 1324, 1326 and 1328 indicating changeable total display times, for example, three hours, four hours, and twelve hours. In a state where a touch after the long-press 1300 has not been released, when a touch release is detected after a touch input moves to a particular menu item, for example, to a three hour item 1322 which is indicated by an arrow 1330, the wrist watch 1310 replaces sector areas 1312 to 1316 corresponding to schedule items for six hours on the display screen with sector areas 1312a and 1314a corresponding to schedule items for three hours and displays the replaced sector areas 1312a and 1314a.

Figure 14A:
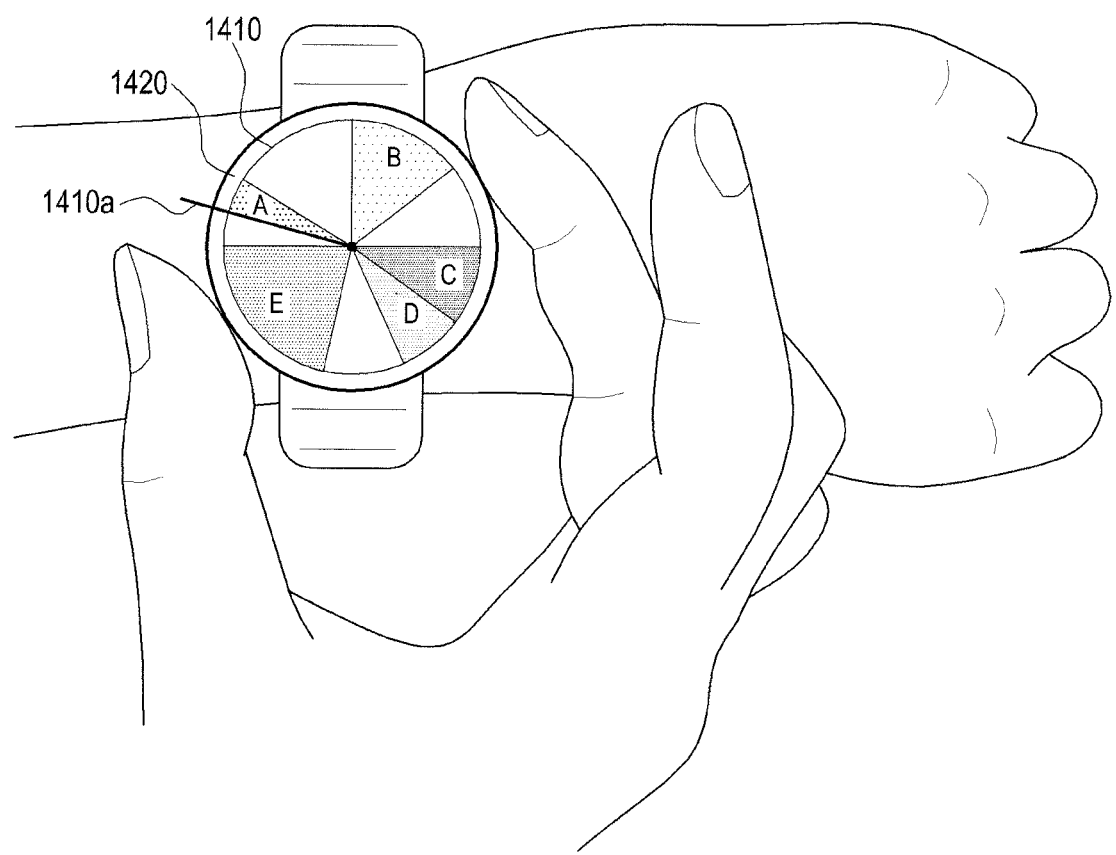
FIGS. 14A, 14B and 14C illustrate examples of changing a display of schedule data in a wrist watch according to an embodiment of the present disclosure.
Figure 14B:
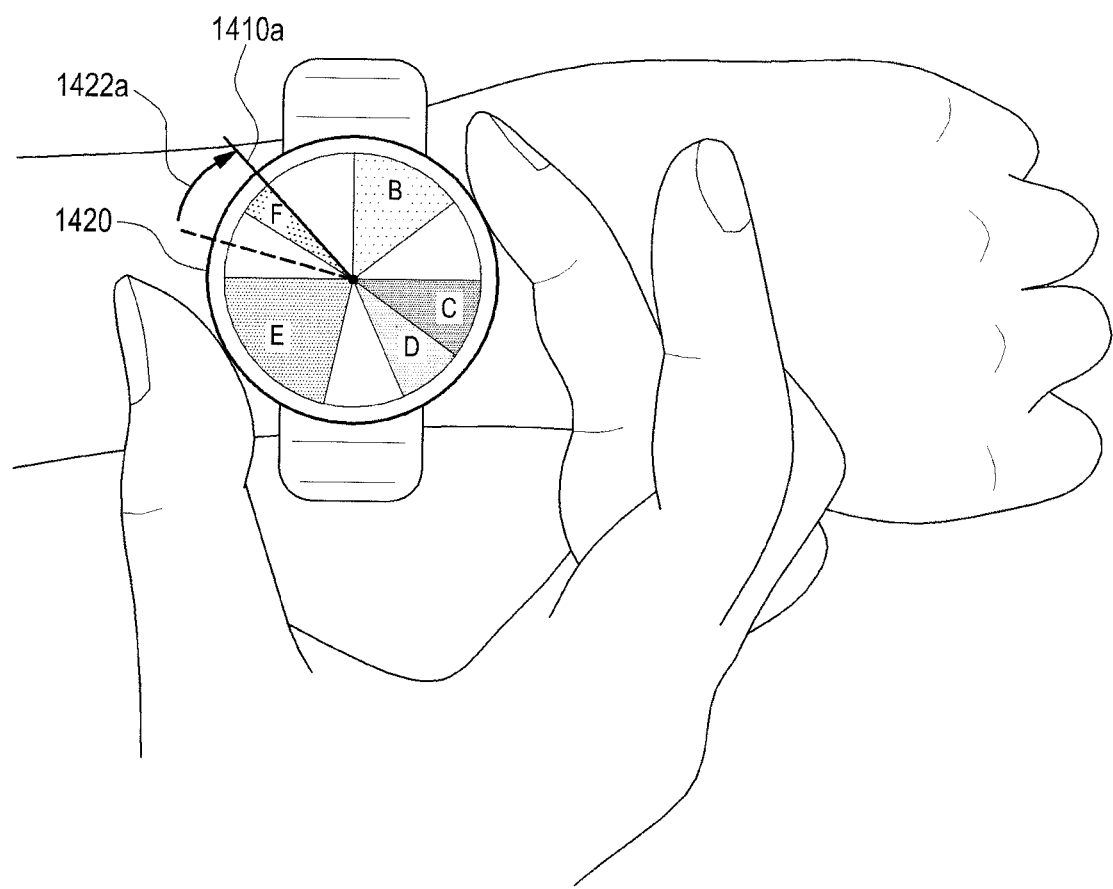
Figure 14C:
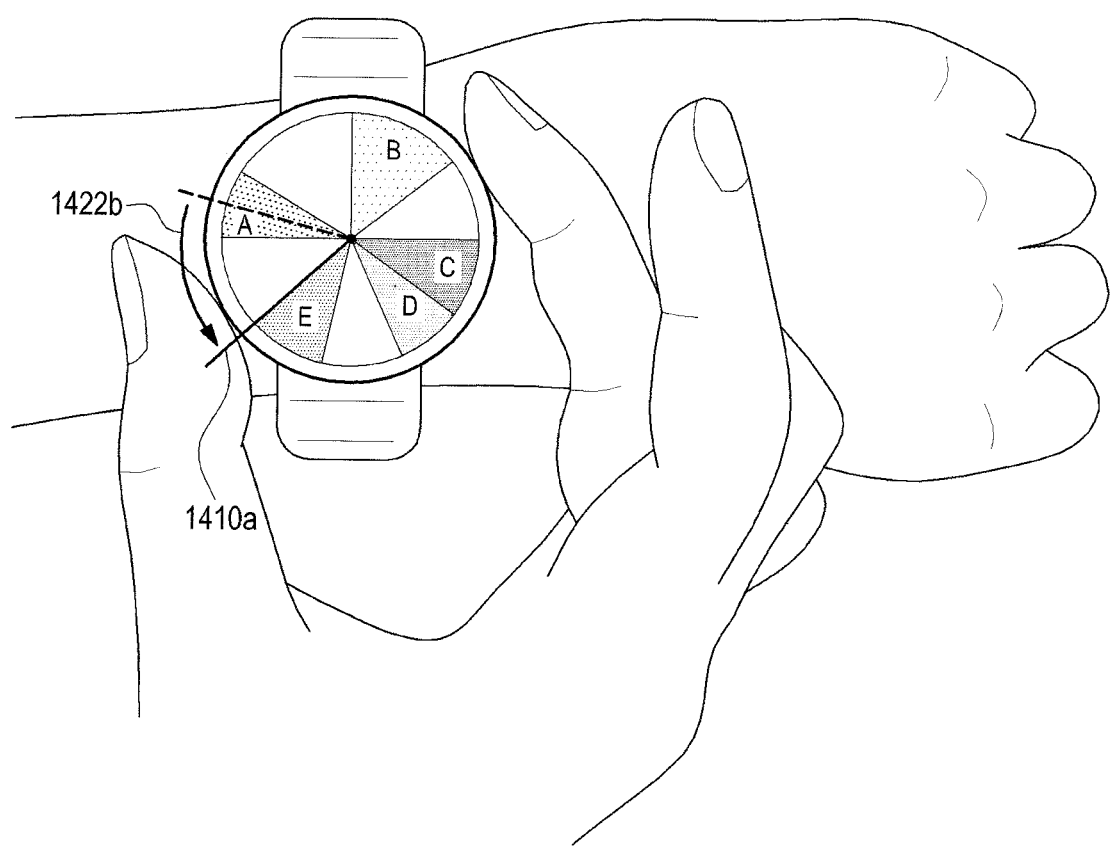

FIGS. 14A, 14B and 14C illustrate examples of changing a display of schedule data in a wrist watch according to an embodiment of the present disclosure.

In FIGS. 14A, 14B and 14C, an example of a wrist watch 1410 displaying schedule data in a daily view mode will be described.

Referring to FIG. 14A, the wrist watch 1410 includes a rotatable rotary 1420 and controls a display of schedule data according to a rotation of the rotary 1420. The wrist watch 1410 sequentially displays sector areas A, B, C, D and E corresponding to schedule items for twelve hours from a current time in a circular form on the display screen, and the sector areas A to E start at an hour hand position corresponding to the current time and are sequentially arranged in a clockwise direction. A reference line 1410 in a bar form may be additionally displayed on the hour hand position corresponding to the current time.

When a rotation of the rotary 1420 is detected, the wrist watch 1410 moves the reference line 1410a according to a direction of the rotation, and accordingly, previous or next schedule data is displayed. Although not illustrated, when the wrist watch 1410 includes a display screen implemented as a touch screen without the rotary 1420, the wrist watch 1410 moves the reference line 1410a and display previous or next schedule data as the wrist watch detects a circular movement after a long-press from the display screen or the reference line 1410a.

Referring to FIG. 14B, when the rotary 1420 detects a rotation 1422a in a clockwise direction, the wrist watch 1410 performs a circular movement of the reference line 1410a by an amount of the rotation 1422a in the clockwise direction. As the reference line 1410a is moved as described above, the part 1422a of the sector area F corresponding to the next schedule data after the last sector area E is additionally displayed after the reference line 1410a, and the first sector area A is hidden by the additionally displayed part 1422a. Although not illustrated, when the rotary 1420 has a larger rotation 1422a, additional next sector areas may be displayed within a range which does not exceed the reference line 1410a.

Referring to FIG. 14C, when a rotation 1422b of the rotary 1420 in a counterclockwise direction is detected, the wrist watch 1410 performs a circular movement of the reference line 1410a by an amount of the rotation 1422b in the counterclockwise direction. As the reference line 1410a is moved as described above, the previous part 1422a of the first sector area A is additionally displayed, and a part of the last sector area E is hidden by the additionally displayed part 1422a. Although not illustrated, when the rotary 1420 has a larger rotation 1422b, at least one previous sector area before the first sector area A may be additionally displayed within a rage which does not exceed the reference line 1410a.

Figure 15A:
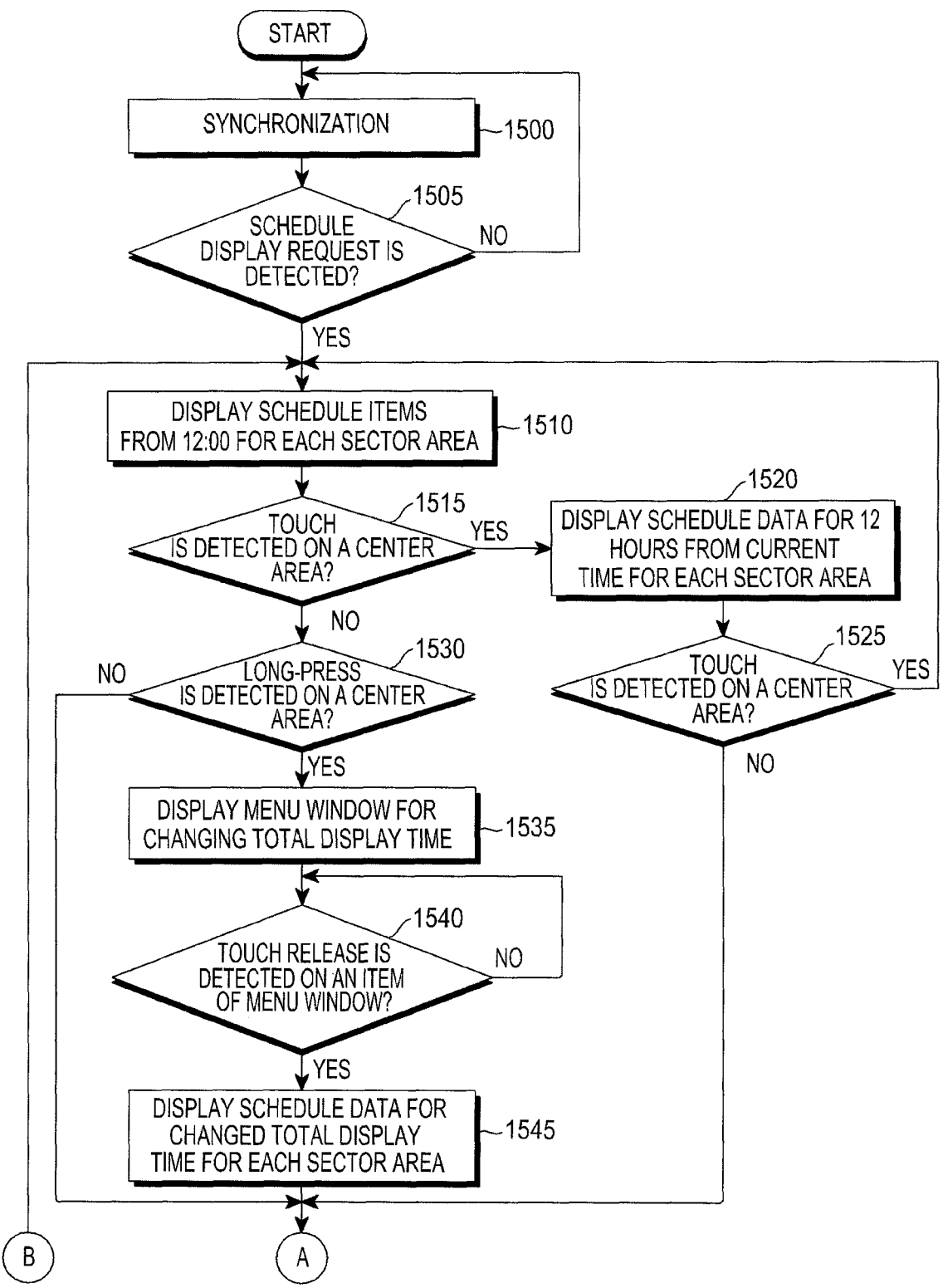
FIGS. 15A and 15B are flowcharts illustrating a process of changing a view mode of a wrist watch according to an embodiment of the present disclosure.
Figure 15B:
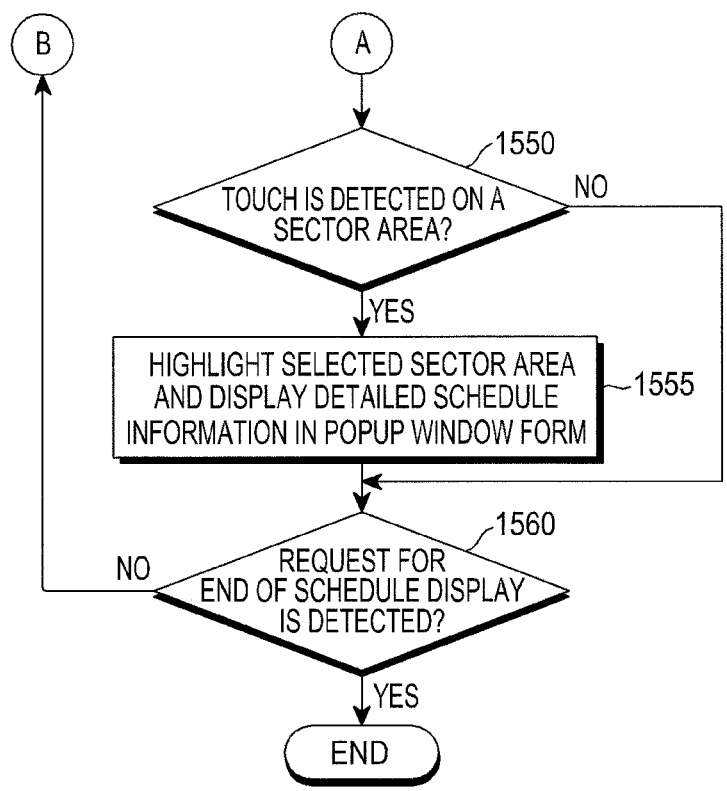

FIGS. 15A and 15B are flowcharts illustrating a process of changing a view mode of the wrist watch according to an embodiment of the present disclosure.

Referring to FIGS. 15A and 15B, the wrist watch is synchronized with the portable electronic device by using, for example, Bluetooth at operation 1500. That is, the wrist watch has schedule data synchronized with the portable electronic device. When the wrist watch receives a schedule display request from the user at operation 1505, the wrist watch displays sector areas corresponding to schedule items for a total display time from 12:00 indicating a reference time in a circular form on the display screen at operation 1510. That is, the sector areas are displayed in a now view mode.

The wrist watch detects a user input, for example, a touch from a center area of the display screen at operation 1515, and changes the view mode to a daily view mode in response to the user input and sequentially arranges and displays sector areas corresponding to schedule items for twelve hours in a clockwise direction, starting from an hour hand position corresponding to the current time at operation 1520. The wrist detects whether a touch is detected from the center area of the display screen while schedule data is displayed in a daily view mode at operation 1525. When the touch is detected, the wrist watch changes the daily view mode to a now view mode at operation 1510. In contrast, when the touch is not detected, operation 1530 is performed.

Meanwhile, when the touch is not detected from the center area of the display screen of the wrist watch at operation 1515, the wrist watch detects a user input, for example, a long-press from the center area of the display screen at operation 1530 and proceeds to operation 1535. At operation 1535, the wrist watch displays a menu window for changing a total display time of schedule data on the display screen at operation 1535. The menu window includes a plurality of menu items indicating the changeable total display time, and is displayed after the long-press and continues on the screen before the touch is released.

At operation 1540, the wrist watch detects whether the touch is released on a menu item from among menu items included in the menu window. When the touch release is detected, the wrist watch identifies the total display time corresponding to the menu item on a position where the touch is released and displays sector areas corresponding to schedule items for the identified total display time on the display screen at operation 1545.

Referring to FIG. 15B, at operation 1550, the wrist watch determines whether the touch is detected from a particular sector area from among the sector areas displayed on the display screen. When the touch is detected from the particular sector area, the wrist watch highlights the sector area on the position selected by the touch and displays detailed schedule information of the schedule item corresponding to the sector area, for example, a title, a start time, an end time, a memo, a schedule type, or the like, in a popup window form at operation 1555. The remaining sector areas except for the selected sector area may be dimly or opaquely displayed. In an embodiment, the highlighted sector area and the detailed schedule information are displayed for an amount of time and then automatically disappear. In an embodiment, the highlighted sector area and the detailed schedule information may disappear when a touch is detected from the display screen.

At operation 1560, the wrist watch determines whether to end the display of the schedule. When a command instructing to end the display of the schedule is detected, the wrist watch removes the displayed sector areas from the display screen, and executes a function, for example, a function of displaying a watch screen.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A wearable additional device for displaying a schedule, the wearable additional device comprising:
   a storage having instructions stored therein;
   a display screen;
   a controller; and
   a transceiver;
   wherein, upon an execution of the instructions, the controller is configured to:
      receive an amount of schedule data from a first reference time, through the transceiver, from a portable electronic device,
      control the display screen to display a schedule based on the amount of schedule data in a form having a plurality of sector areas in response to a first user input for displaying the schedule on the display screen being received, wherein each of the plurality of sector areas corresponds respectively to a corresponding one of a plurality of schedule items included in the amount of schedule data,
   wherein each of the plurality of sector areas includes an area proportional to a time of the corresponding one of the plurality of schedule items to which each of the plurality of sector areas corresponds respectively, a total area of the plurality of sector areas being related to a total time of the plurality of schedule items,
   wherein the plurality of sector areas are chronologically arranged in a clockwise direction from the first reference time, and
   wherein the controller is further configured to:
      based on receiving a second user input for changing the first reference time to a second reference time and an amount of schedule data from the second reference time being not within the received schedule data, transmit a request for additional schedule data not within the received schedule data to the portable electronic device, and
      receive, through the transceiver, the additional schedule data.

2. The wearable additional device of claim 1, wherein the controller is further configured to receive at least one of the first user input or the second user input from:
   the portable electronic device, or
   a touch sensor in the display screen of the wearable additional device.

3. The wearable additional device of claim 1,
   wherein the first reference time is a current time,
   wherein the plurality of sector areas are displayed starting at a 12:00 position on the display screen or at an hour hand corresponding to the current time, and
   wherein the plurality of sector areas are arranged in the clockwise direction.

4. The wearable additional device of claim 1, wherein the plurality of sector areas comprises at least one text character string indicating at least one of a title, a start time, an end time, a memo, or a classification of the corresponding one of the plurality of schedule items to which each of the plurality of sector areas corresponds respectively.

5. The wearable additional device of claim 1, wherein the plurality of sector areas have different colors in accordance with character strings of the corresponding one of the plurality of schedule items to which each of the plurality of sector areas corresponds respectively.

6. The wearable additional device of claim 1, wherein the amount of schedule data from the first reference time is received from the portable electronic device using a wired connection.

7. The wearable additional device of claim 1, wherein a current sector area of the plurality of sector areas displays a progress bar indicating a progress state of the corresponding one of the plurality of schedule items.

* * * * *